(12) United States Patent
Otsubo et al.

(10) Patent No.: US 7,855,286 B2
(45) Date of Patent: Dec. 21, 2010

(54) TITANYL PHTHALOCYANIN CRYSTAL, METHOD FOR PREPARING THE SAME AND ELECTROPHOTOGRAPHIC PHOTOCONDUCTOR

(75) Inventors: Junichiro Otsubo, Osaka (JP); Jun Azuma, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 12/589,874

(22) Filed: Oct. 29, 2009

(65) Prior Publication Data
US 2010/0081073 A1 Apr. 1, 2010

Related U.S. Application Data

(63) Continuation of application No. 11/598,463, filed on Nov. 13, 2006, now abandoned.

(30) Foreign Application Priority Data

Nov. 16, 2005 (JP) ............... 2005-331653

(51) Int. Cl.
*C09B 47/067* (2006.01)
(52) U.S. Cl. .................... 540/143; 530/59.5
(58) Field of Classification Search ............ 540/143; 430/59.5
See application file for complete search history.

(56) References Cited

U.S. PATENT DOCUMENTS

| 5,576,131 | A | 11/1996 | Takai et al. | |
|---|---|---|---|---|
| 6,313,288 | B1* | 11/2001 | Shimada et al. | 540/140 |
| 2003/0013028 | A1 | 1/2003 | Tadokoro et al. | |
| 2004/0033428 | A1 | 2/2004 | Niimi | |

FOREIGN PATENT DOCUMENTS

| EP | 1 521 126 | 4/2005 |
|---|---|---|
| JP | 08-176456 A | 7/1996 |
| JP | 3463032 B | 8/2003 |
| JP | 2004-145284 A | 5/2004 |

OTHER PUBLICATIONS http://www.ecplaza.net/product/43546_45422/tetra_nbutyl_titanate.html, copyright 1996.*

* cited by examiner

*Primary Examiner*—Mark F Huff
*Assistant Examiner*—Peter L Vajda
(74) *Attorney, Agent, or Firm*—Carmody & Torrance LLP

(57) ABSTRACT

According to the present invention, a titanyl phthalocyanin crystal excellent in storage stability in organic solvents, a method for preparing the same and an electrophotographic photoconductor using the same are provided. In the titanyl phthalocyanin crystal, the method for preparing such a titanyl phthalocyanin crystal and the electrophotographic photoconductor using the same, the titanyl phthalocyanin crystal is characterized by having the maximum peak at a Bragg angle $2\theta \pm 0.2° = 27.2°$ in a CuKα characteristic X-ray diffraction spectrum and one peak within the range of 270 to 400° C. other than a peak accompanied by the vaporization of adsorbed water in a differential scanning calorimetric analysis.

8 Claims, 18 Drawing Sheets

(a)

(b)

(c)

TITANYL PHTHALOCYANIN CRYSTAL, METHOD FOR PREPARING THE SAME AND ELECTROPHOTOGRAPHIC PHOTOCONDUCTOR

CROSS REFERENCE TO RELATED APPLICATIONS

This application is a continuation of U.S. application Ser. No. 11/598,463, filed Nov. 13, 2006, now abandoned, the subject matter of which is herein incorporated by reference in its entirety.

BACKGROUND OF THE INVENTION

1. Field of the Invention

The present invention relates to a titanyl phthalocyanin crystal prepared from a titanyl phthalocyanin compound, the method for preparing the same and an electrophotographic photoconductor using the same. Particularly, the present invention relates to a titanyl phthalocyanin crystal excellent in the storage stability in organic solvents, the method for preparing the same and an electrophotographic photoconductor using the same.

2. Related Art

Generally, organic photoconductors have been frequently and recently used in electrophotographic photoconductors applied in electrophotographic devices such as a copy machine and a laser printer, etc. upon such requirements as low cost and low environment polluting property, etc. Phthalocyanin pigments that are sensitive to a light of infrared to near-infrared wavelengths irradiated from a semiconductor laser or an infrared LED, etc. have been widely used as charge-generating agent used in such organic photoconductors.

It has been known that metal-free phthalocyanin compounds, copper phthalocyanin compounds, titanyl phthalocyanin compounds, etc. exist in such phthalocyanin pigments depending on a chemical structure thereof, and various crystal types can be obtained due to different preparation conditions for each phthalocyanin compound.

Thus, it has been known that when a photoconductor using a titanyl phthalocyanin with a Y-type crystal structure as a charge-generating agent is constituted in the existence of many types of phthalocyanin compound crystals having different crystal types, electric characteristics in the photoconductor is improved as compared with a case of using tithanylphthalocyanines of other crystal types.

For example, there has been disclosed a method for preparing a Y-type crystal prepared by reacting a titanium compound and an organic compound that is a titanyl phthalocyanin having the maximum peak at a Bragg angle $(2\theta \pm 0.2°)=27.3°$ for a CuK$\alpha$ line in an X-ray diffraction spectrum and can form a phthalocyanin ring under conditions of 130° C. and about 4 hrs in dialkyl-aminoalcohol added with urea or ammonia (e.g., Patent document 1).

There has also been disclosed a method for preparing a titanium phthalocyanin compound of Y-type crystal prepared by directly reacting o-phthalonitrile and titanium tetrabutoxide without using a urea compound under conditions of 215° C. and about 2 hrs (e.g., Patent documents 2 and 3).

More specifically, there has been disclosed a method for preparing a titanyl phthalocyanin crystal having a peak within a predetermined range in the CuK$\alpha$ characteristic X-ray diffraction spectrum and no peak within the range of 50 to 400° C. in the differential scanning calorimetric analysis.

[Patent document 1] JPH8-176456A (examples)
[Patent document 2] JP2001-181531 (claims)
[Patent document 3] JP2004-145284A (claims)

SUMMARY OF THE INVENTION

Problems to be Solved

However, according to Patent document 1, there has been found the problem that the prepared titanyl phthalocyanin crystal having a Y-type structure had a tendency to cause crystal transition to a β-type or α-type crystal in a coating solution for a photosensitive layer. Therefore, there has been found the problem that the coating solution for the photosensitive layer is insufficient in storage stability, and thereby a photosensitive layer having good electric characteristics cannot be formed.

On the other hand, when a titanyl phthalocyanin crystal described in Patent document 2 or Patent document 3 was used, the crystal transition from the Y-type crystal in the coating solution for the photosensitive layer to a β-type crystal poor in sensitivity characteristic could be inhibited, but there found such a case that an image forming device using a photoconductor with a titanyl Phthalo-cyanin crystal described in Patent document 2 or Patent document 3 caused fogging and did not give a good image under a high temperature condition and a high humidity condition.

Therefore, as a result of intensive investigation for solving above-mentioned problems, present inventors discovered that the storage stability of a titanyl phthalocyanin crystal in organic solvents was enhanced and a good image was simultaneously obtained by controlling the crystal so as to have a peak at a prescribed Bragg angle in the CuK$\alpha$ characteristic X-ray diffraction spectrum, and at the same time, have one peak within a predetermined temperature range in the differential scanning calorimetric analysis.

That is, the object of present invention is to provide a titanyl phthalocyanin crystal excellent in storage stability in organic solvents, a method for preparing such a titanyl phthalocyanin crystal and an electrophotographic photoconductor using the same.

The Means for Solving the Problems

The present invention enables to provide a titanyl phthalocyanin crystal characterized by having the maximum peak at a Bragg angle $2\theta \pm 0.2°=27.2°$ in a CuK$\alpha$ characteristic X-ray diffraction spectrum and one peak within the range of 270 to 400° C. other than a peak accompanied by the vaporization of adsorbed water in a differential scanning calorimetric analysis to solve the above-mentioned problems.

That is, if the crystal is the titanyl phthalocyanin crystal having such an optical characteristic and thermal characteristic, it may effectively inhibit the crystal transition to the α-type crystal or β-type crystal even if it is immersed in an organic solvent for a long time, e.g., 7 days or longer. Accordingly, the present invention enables to obtain a coating solution for a photosensitive layer more excellent in storage stability and stably constitute an electrophotographic photoreceptor excellent in electric characteristics and image characteristics by using the same.

It is preferable that the titanyl phthalocyanin crystal of present invention has no peak at a Bragg angle $2\theta \pm 0.2°=26.2°$ in the CuK$\alpha$ characteristic X-ray diffraction spectrum when the crystal is prepared.

Due to such a composition, the transition of titanyl phthalocyanin crystal to the β-type may be further controlled for a long time and the storage stability of titanyl phthalocyanin crystal in organic solvents may be further improved.

It is preferable that the titanyl phthalocyanin crystal of present invention recovered after being immersed for 7 days in an organic solvent has at least the maximum peak at a Bragg angle $2\theta \pm 0.2°=27.2°$ and no peak at 26.2° in the CuKα characteristic X-ray diffraction spectrum when the crystal is prepared.

Due to such a composition, the transition of titanyl phthalocyanin crystal in organic solvents may be further reliably controlled and consequently whether the titanyl phthalocyanin crystal is excellent in storage stability may be determined quantitatively.

It is preferable that the organic solvent is at least one selected from the group consisting of tetrahydrofuran, dichloromethane, toluene, 1,4-dioxane and 1-methoxy-2-propanol when the titanyl Phthalocyanin crystal of present invention is prepared.

Due to such a composition, the stability of the specific titanyl phthalocyanin crystal may be further reliably determined when such organic solvents are used as organic solvents for the coating solution for the photosensitive layer.

It is preferable that the structure of titanyl phthalocyanin compound prepared form the titanyl phthalocyanin crystal of present invention is represented by the following general formula when the crystal is prepared.

Due to such a composition, the storage stability of titanyl phthalocyanin crystal of the specific structure in organic solvents may be further improved.

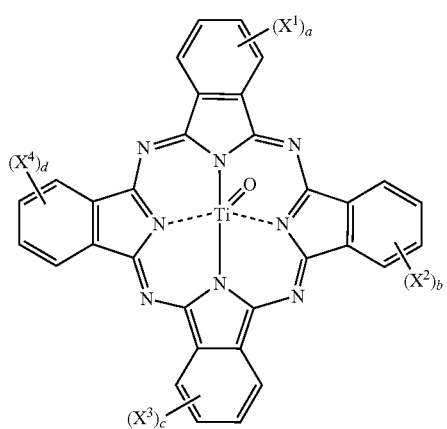

(1)

(In the general formula (1), $X^1$ to $X^4$ are the same or different substituents, each independently represents a hydrogen atom, a halogen atom, a substituted or an unsubstituted alkyl group, a substituted or an unsubstituted alkoxy group, a substituted or an unsubstituted cyano group or a substituted or an unsubstituted nitro group, respectively. The repeat numbers "a", "b", "c" and "d" represent an integer of 1 to 4, respectively and may be same or different, respectively.)

Another aspect of the present invention is a method for preparing titanyl phthalocyanin crystal having the maximum peak at a Bragg angle $2\theta \pm 0.2°=27.2°$ in the CuKα characteristic X-ray diffraction spectrum and one peak within the range of 270 to 400° C. other than a peak accompanied by the vaporization of adsorbed water in the differential scanning calorimetric analysis. Then, it is a method for preparing characterized by comprising the following processes (a) and (b);

(a) a process for preparing a titanyl phthalocyanin compound by adding a titanium alkoxide or titanium tetrachloride at a value within the range of 0.40 to 0.53 mole with respect to 1 mole of o-phthalonitrile or its derivative or 1,3-diiminoisoindoline or its derivative and adding a urea compound at a value within the range of 0.1 to 0.95 mole with respect to 1 mole of o-phthalonitrile or its derivative or 1,3-diiminoisoindoline or its derivative to react the compounds, (b) a process for preparing a titanyl phthalocyanin crystal by performing an acid treatment on the titanyl phthalocyanin compound prepared in the process (a).

That is, ammonia generated by reacting raw materials and a urea compound facilitates forming a complex compound with a titanium alkoxide more efficiently by preparing the titanyl phthalocyanin crystal by the method comprising the above processes (a) to (b). Therefore, such a complex compound enables to prepare the titanyl phthalocyanin crystal that is hard to change its crystal type and excellent in storage stability even in organic solvents by further accelerating the reaction of raw materials.

It is preferable that the urea compound is at least one compound selected from the group consisting of urea, thiourea, o-methylisourea sulfate, o-methylisourea carbonate and o-methylisourea hydrochloride in the above-mentioned process (a) when the method for preparing titanyl phthalocyanin crystal of the present invention is performed.

Due to such an embodiment, the titanyl phthalocyanin crystal that is hard to cause the crystal transition to the α-type crystal and β-type crystal may be efficiently obtained by interaction of such urea compounds and the raw materials even if the crystal is immersed in an organic solvent for a long time, e.g., 7 days or longer. As a result, the titanyl phthalocyanin crystal with improved storage stability may be prepare at a lower cost.

It is preferable that the reaction temperature in the process (a) is set to a value of 150° C. or above when the method for preparing titanyl phthalocyanin crystal of present invention is performed.

Due to such an embodiment, products generated as a vapor from the reaction system may be removed to the outside, and thereby allow to react a titanium alkoxide or titanium tetrachloride as raw material and a urea compound.

It is preferable that the process (a) is performed in a nitrogen-containing compound with a boiling point of 180° C. or above when the method for preparing titanyl phthalocyanin crystal of the present invention is performed.

Due to such an embodiment, ammonia generated by a reaction of a urea compound and a titanium alkoxide or titanium tetrachloride allows to form a complex with the titanium alkoxide or titanium tetrachloride. As a result, the reaction fully proceeds, and a titanyl Phthalocyanin crystal that is hard in crystal transition in an organic solvent may be efficiently prepared in a short time.

Still more, another aspect of the present invention is an electrophotographic photoconductor characterized by the fact that a photosensitive layer is provided on a conductive substrate, and the photosensitive layer contains the titanyl phthalocyanin crystal having the maximum peak at a Bragg angle $2\theta \pm 0.2°=27.2°$ in the CuKα characteristic X-ray diffraction spectrum and one peak within the range of 270 to 400° C. other than a peak accompanied by the vaporization of adsorbed water in the differential scanning calorimetric analysis within the range of 0.1 to 50 part by weight with respect to 100 part by weight of a binder resin forming the photosensitive layer.

That is, an electrophotographic photoconductor having good electric characteristics and image characteristics may be stably obtained by using the titanyl phthalocyanin crystal as a charge generating agent having little crystal transition and excellent storage stability even if it is immersed in an organic solvent for a long time.

It is preferable that a single layer photosensitive layer containing at least either hole transfer agent or electron transfer agent is used as the composition of a photosensitive layer, and it is also preferable that a single layer photosensitive layer containing both transfer agent and electron transfer agent is used as the composition of a photosensitive layer. It is also preferable that a laminated layer constituted by containing a charge generating layer and a charge transfer layer containing either hole transfer agent or electron transfer agent is used as the composition of a photosensitive layer.

DETAILED DESCRIPTION OF THE INVENTION

First Embodiment

Figure 1:
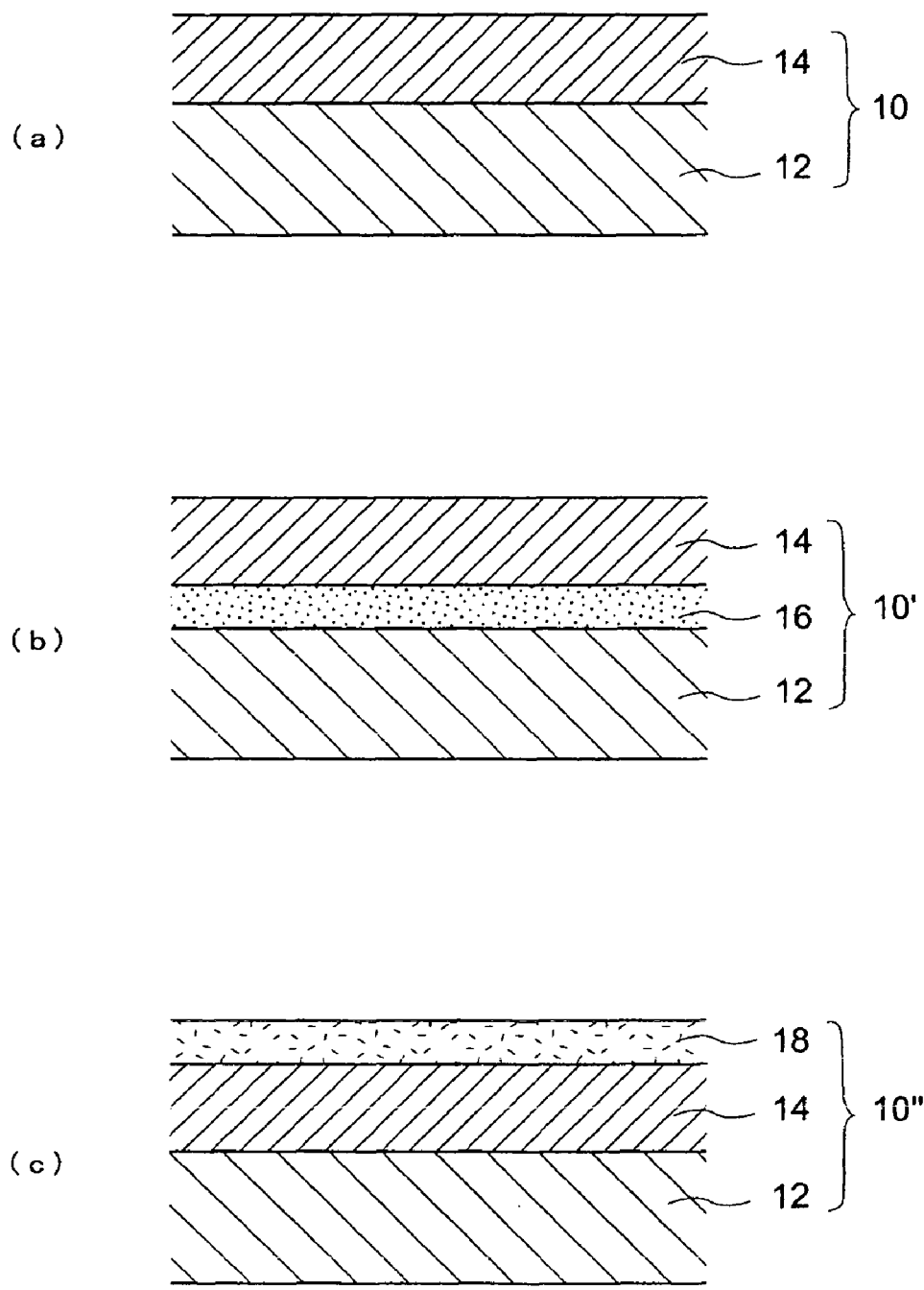
FIGS. 1 (a) to (c) are a schematic view for illustrating the composition of a single layer type photoconductor.

First Embodiment of the present invention is a titanyl phthalocyanin crystal characterized by having the maximum peak at a Bragg angle $2\theta \pm 0.2°=27.2°$ in the CuKα characteristic X-ray diffraction spectrum and one peak within the range of 270 to 400° C. other than a peak accompanied by the vaporization of adsorbed water in the differential scanning calorimetric analysis.

The titanyl phthalocyanin crystal of First Embodiment is described hereinafter by dividing it into components.

1. Optical Characteristics and Thermal Characteristics (1) Optical Characteristics The titanyl phthalocyanin crystal as present invention is characterized by having the maximum peak at a Bragg angle $2\theta \pm 0.2°=27.9°$ in the CuKα characteristic X-ray diffraction spectrum as an optical characteristic (first optical characteristic).

It is preferable that the crystal has no peak at a Bragg angle $2\theta \pm 0.2°=26.2°$ in the CuKα characteristic X-ray diffraction spectrum (second optical characteristic).

It is preferable that the crystal has no peak at. a Bragg angle $2\theta \pm 0.2°=7.2°$ in the CuKα characteristic X-ray diffraction spectrum (third optical characteristic).

This is because the stability in organic solvents when no first optical characteristic tends to be significantly lower than the titanyl phthalocyanin crystal having such an optical characteristic. Conversely, the storage stability in organic solvents may be improved by having the first optical characteristic, more preferably, the second optical characteristic and the third optical characteristic.

It is preferable that the titanyl phthalocyanin crystal recovered after being immersed in organic solvents for 7 days at least has the maximum peak at a Bragg angle $2\theta \pm 0.2°=27.2°$ in the CuKα characteristic X-ray diffraction spectrum and no peak at a Bragg angle $2\theta \pm 0.2°=26.2°$.

This is because the crystal transition of the titanyl phthalocyanin crystal in organic solvents may be more reliably controlled due to the fact that the titanyl phthalocyanin crystal may keep the above-mentioned characteristics even if it is immersed for 7 days in organic solvents.

It is preferable that the evaluation of immersion test in organic solvents on the basis of evaluating the storage stability of the titanyl phthalocyanin crystal is performed under the same conditions as, for example, conditions for actually keeping a coating solution for a photosensitive layer for preparing an electrophotographic photoconductor (called coating solution for the photosensitive layer hereinafter). Accordingly, for example, it is preferable that the storage stability of the titanyl phthalocyanin crystal is evaluated in a closed system under conditions of a temperature 23±1° C. and relative humidity 50 to 60% RH.

It is preferable that the organic solvent is at least one solvent selected from the group consisting of tetrahydrofuran, dichloromethane, toluene, 1,4-dioxane and 1-methoxy-2-propanol in evaluating the storage stability of the titanyl phthalocyanin crystal.

This is because the stability of the specific titanyl phthalocyanin crystal may be more reliably determined and the compatibility in the specific titanyl phthalocyanin crystal, charge transfer agent and binder resin, etc. is improved when such organic solvents are used as organic solvents in the coating solution for the photosensitive layer. Accordingly, a photoconductor for more effectively obtaining characteristics of the specific titanyl phthalocyanin crystal, charge transfer agent, etc. may be formed and an electrophotographic photoconductor excellent in electric characteristics and image characteristics may be stably constituted.

(2) Thermal Characteristics

In present invention, the titanyl phthalocyanin crystal is characterized by having one peak within the range of 270 to 400° C. other than a peak accompanied by the vaporization of adsorbed water in the differential scanning calorimetric analysis.

This is because the titanyl phthalocyanin crystal having such optical characteristics and thermal characteristics may effectively inhibit the crystal transition of the crystal structure from α-type crystal to β-type crystal even if it is added into an organic solvent and left for a long time. Accordingly, a coating solution for a photosensitive layer excellent in storage stability may be obtained by using such a titanyl phthalocyanin crystal. As a result, an electrophotographic photoconductor excellent in electric characteristics and image characteristics may be stably constituted.

The one peak that is a peak other than a peak accompanied by the vaporization of adsorbed water and appears within the range of 270 to 400° C. preferably appears within the range of 290 to 400° C. and more preferably within the range of 300 to 400° C.

A specific method for measuring the Bragg angle in the CuKα characteristic X-ray diffraction spectrum and a specific method of the differential scanning calorimetric analysis will be described in detail in examples described hereinafter.

2. Structure of Titanyl Phthalocyanin Compounds

It is preferable that titanyl phthalocyanin compounds are compounds having the structure represented by the above-mentioned general formula (1).

This is because not only the stability of the specific titanyl phthalocyanin crystal may be further improved, but also the specific titanyl phthalocyanin crystal may be stably prepared by using the titanyl phthalocyanin compounds of such a structure.

It is more preferable that the structure of titanyl phthalocyanin compounds is represented by the following general formula (2). It is particularly preferable that the titanyl phthalocyanin compounds are represented by the following general formula (3).

This is because such a structure of titanyl phthalocyanin allows a specific titanyl phthalocyanin crystal having more stable property to prepare easily.

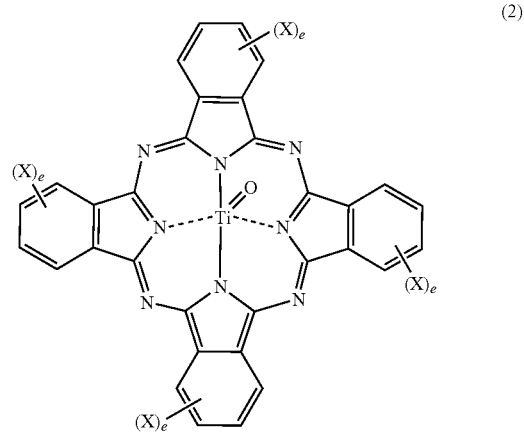

(2)

(In the general formula (2), X represents a hydrogen atom, a halogen atom, an alkyl group, an alkoxy group, a cyano group or a nitro group, and the repeat number "e" represents an integer of 1 to 4.)

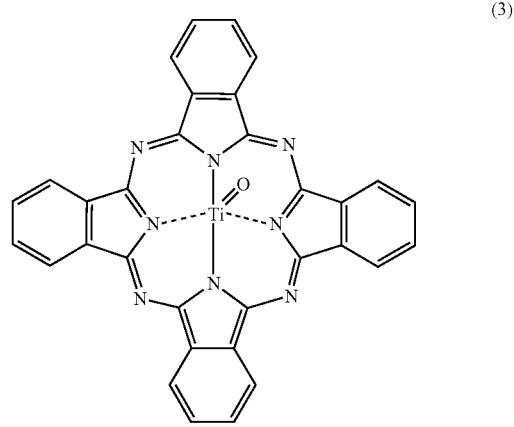

(3)

Second Embodiment

Second Embodiment is a method for preparing the titanyl phthalocyanin crystal having the maximum peak at a Bragg angle 2 θ±0.2°=27.2° in the CuKα characteristic X-ray diffraction spectrum and one peak within the range of 270 to 400° C. other than a peak accompanied by the vaporization of adsorbed water in the differential scanning calorimetric analysis and is characterized by comprising the following processes (a) and (b);

(a) a process for preparing a titanyl phthalocyanin compound by adding a titanium alkoxide or titanium tetrachloride at a value within the range of 0.40 to 0.53 mole with respect to 1 mole of o-phthalonitrile or its derivative or 1,3-diiminoisoindoline or its derivative and adding a urea compound at a value within the range of 0.1 to 0.95 mole with respect to 1 mole of o-phthalonitrile or its derivative or 1,3-diiminoisoindoline or its derivative to react the compounds, (b) a process for preparing a titanyl phthalocyanin crystal by performing an acid treatment on the titanyl phthalocyanin compound prepared in the process (a).

The contents already described in First Embodiment are properly omitted and the above-mentioned method for preparing titanyl phthalocyanin crystal is mainly described hereinafter.

1. A Processes for Preparing a Titanyl Phthalocyanin Compound

A process for preparing a titanyl phthalocyanin compound is characterized by reacting o-phthalonitrile or its derivative or 1,3-diiminoisoindoline or its derivative and a titanium alkoxide or titanium tetrachloride as materials for preparing such a molecule in the presence of a urea compound to prepare a titanyl phthalocyanin compound.

Here, the method for preparing the titanyl phthalocyanin compound represented by the general formula (3) is specifically described as an example.

That is, when the titanyl phthalocyanin compound represented by the formula (3) is prepared, it is preferably preformed according to the following reaction formula (1) or the following reaction formula (2). Titanium tetrabutoxide represented by the formula (5) is used as one example of the titanium alkoxide in the following reaction formula (1) and the following reaction formula (2).

(1) Reaction Formula

Accordingly, it is preferable that the titanyl phthalocyanin compound represented by the formula (3) is prepared by reacting o-phthalonitrile represented by a formula (4) and titanium tetrabutoxide as a titanium alkoxide represented by the formula (5) as shown in the reaction formula (1) or reacting 1,3-diiminoisoindoline represented by a formula (6) and a titanium alkoxide, such as titanium tetrabutoxide, etc. represented by the formula (5) as shown in the reaction formula (2).

Titanium tetrachloride may also be used in place of titanium alkoxide such as titanium tetrabutoxide, etc. represented by the formula (5).

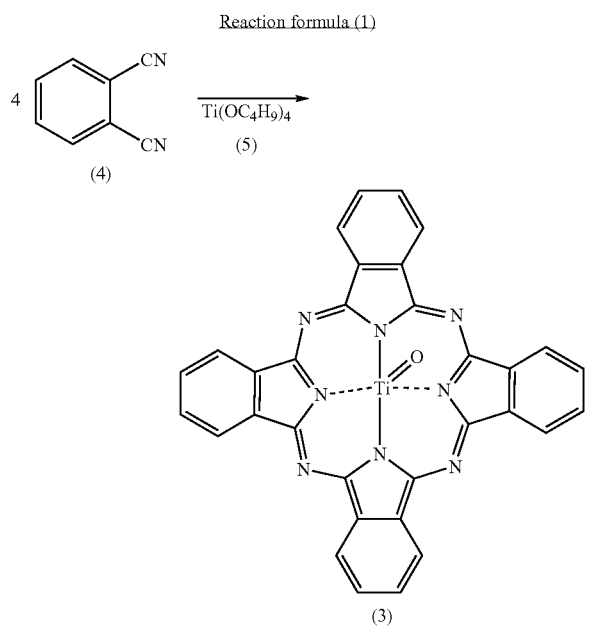

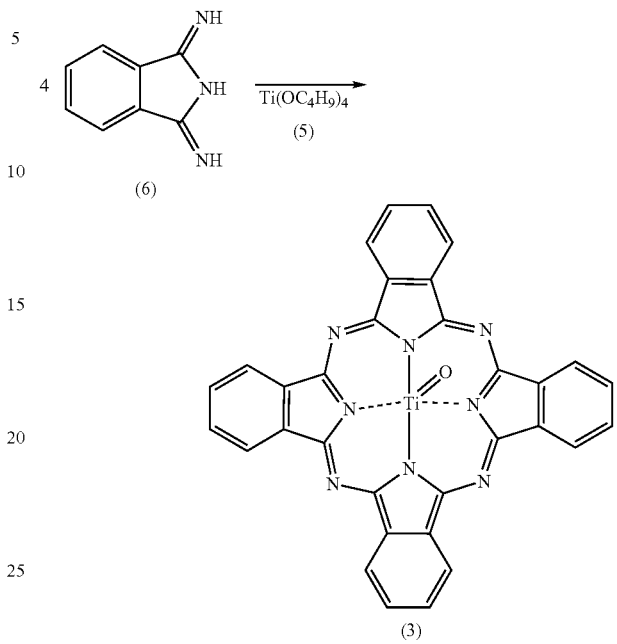

(2) Added Amount

The added amount of the titanium alkoxide, such as titanium tetrabutoxide, etc., represented by the formula (5) or titanium tetrachloride is characterized by setting to a value within the range of 0.40 to 0.53 mole with respect to 1 mole of o-phthalonitrile represented by a formula (4) or its derivative or 1,3-diiminoisoindoline represented by the formula (6) or its derivative.

This is because the interaction with a urea compound described hereinafter is effectively obtained by adding an excess of ¼ equivalent with respect to the amount of titanium alkoxide, such as titanium tetrabutoxide, etc., represented by the formula (5) or titanium tetrachloride to o-phthalonitrile represented by the formula (4) or its derivative or 1,3-diiminoisoindoline represented by the formula (6) or its derivative. Such an interaction will be described in detail in a section of urea compounds.

Accordingly, the amount of the titanium alkoxide such as titanium tetrabutoxide, etc. represented by the formula (5) or titanium tetrachloride is set to a value preferably within the range of 0.43 to 0.50 mole and more preferably in a range of 0.45 to 0.47 mole with respect to 1 mole of o-phthalonitrile represented by the formula (4) or its derivative or 1,3-diiminoisoindoline represented by the formula (6) or its derivative.

(3) Urea Compounds

The process (a) is characterized by performing it in the presence of a urea compound. This is because the interaction in a urea compound and a titanium alkoxide or titanium tetra-chloride is obtained by using a titanyl phthalocyanin compound prepared in the presence of a urea compound, therefore the specific titanyl phthalocyanin crystal may be prepared.

That is, such an interaction is an action in which ammonia generated by the reaction of a urea compound and a titanium alkoxide or titanium tetrachloride further forms a complex with the titanium alkoxide or titanium tetrachloride, and such a substance further accelerates the reaction represented by the reaction formulas (1) and (2). Then, a titanyl phthalocyanin crystal hard in crystal transition may be efficiently prepared even in an organic solvent by reacting the raw materials under such an accelerating action.

(3)-1 Types

The urea compounds used in the process (a) are preferably at least one compound selected from the group consisting of urea, thiourea, o-methylisourea sulfate, o-methylisourea carbonate and o-methylisourea hydrochloride.

This is because ammonia generated in the process of reaction by using such a urea compound as urea compound in the reaction formulas (1) and (2) allows a complex with titanium alkoxide or titanium tetrachloride to form more efficiently, and such a substance further accelerates the reaction represented by the reaction formula (1) and (2).

That is, This is because ammonia generated by reacting a titanium alkoxide or titanium tetrachloride and a urea compound forms a complex compound with the titanium alkoxide, etc. more efficiently and accordingly such a complex compound further accelerates the reaction represented by the reaction formulas (1) and (2).

In addition, it has been known that such a complex compound allows to specifically form when they are reacted in a high temperature condition of 180° C. or above. Therefore, the reactions are performed more effectively in a nitrogen-containing compound with boiling point of 180° C. or above, e.g., quinoline (b.p.: 237.1° C.), isoquinoline (b.p.: 242.5° C.) or their mixture (weight ratio 10:90 to 90:10).

Accordingly, it is more preferable to use urea in the above-mentioned urea compounds since ammonia as reaction accelerator and the complex compound due to it allows to form easily.

(3)-2 Added Amount

The added amount of urea compounds used in the process (a) is characterized by setting to a value within the range of 0.1 to 0.95 mole with respect to 1 mole of o-phthalonitrile or its derivative or 1,3-diiminoisoindoline or its derivative.

This is because the action of above-mentioned urea compounds may be obtained more efficiently by setting the amount of urea compounds to a value within such a range.

Accordingly, the amount of such urea compounds is set to a value within the range of preferably 0.3 to 0.8 mole and more preferably 0.4 to 0.7 mole with respect to 1 mole of o-phthalonitrile or its derivative or 1,3-diiminoisoindoline or its derivative.

(4) Solvents

As solvents used in the process (a), for example, one or any combinations of two or more solvent selected from the group consisting of hydrocarbon solvents such as xylene, naphthalene, methylnaphthalene, tetralin, and nitrobenzene, etc.; halogenated hydrocarbon solvents such as dichlorobenzene, tri-chlorobenzen, dibromobenzene, and chloronaphthalene, etc.; alcohol solvents such as hexanol, octanol, decanol, benzyl alcohol, ethylene glycol, and ethylene glycol, etc.; ketone solvents such as dichlorohexanone, acetophenone, 1-methyl-2-pyrrolidone, and 1,3-dimethyl-2-imidazolidinone, etc.; amide solvents such as formamide, acetamide, etc.; nitrogen-containing solvents such as picoline, quinoline, and isoquinoline, etc. are exemplified.

Particularly, nitrogen-containing solvents of b.p. 180° C. or above, e.g., quinoline and isoquinoline are suitable in that ammonia is generated by reacting a titanium alkoxide or titanium tetrachloride as raw material and a urea compound allows to form a complex compound with the titanium alkoxide, etc. more efficiently.

(5) Reaction Temperature

The reaction temperature in the process (a) is preferably a high temperature condition of 150° C. or above. This is because the complex compound is hard to be formed by reacting a titanium alkoxide or titanium tetrachloride as raw material And a urea compound if such a temperature falls short of 150° C., especially lower than 135° C. Accordingly, such a complex compound becomes difficult to further accelerate the reactions represented by the reaction formulas (1) and (2), thus the titanyl phthalocyanin crystal hard in crystal transition becomes difficult to be efficiently prepared even in an organic solvent.

Accordingly, the reaction temperature in the process (a) is preferably set to a value within the range of 180 to 250° C., and more preferably a value within the range of 200 to 240° C.

(6) Reaction Time

The reaction time in the process (a) is dependent upon the reaction temperature, but it is preferably set to a range of 0.5 to 10 hrs. This is because a complex compound becomes hard to form by reacting a titanium alkoxide or titanium tetrachloride as raw material and a urea compound if such a reaction time falls short of 0.5 hrs. Accordingly, such a complex compound becomes difficult to further accelerate the reactions represented by the reaction formulas (1) and (2), thus the titanyl phthalocyanin crystal hard in crystal transition becomes difficult to be efficiently prepared even in an organic solvent. On the other hand, if such a reaction time exceeds 10 hrs, it leads to disadvantage in economy or sometimes the formed complex compound is reduced.

Accordingly, the reaction time in the process (a) is preferably set to a value within the range of 0.6 to 3.5 hrs, and more preferably set to a value in a range of 0.8 to 3 hrs.

2. A Processes for Preparing Titanyl Phthalocyanin Crystal

Next, it is preferable that an acid treatment as a post-treatment is performed for the titanyl phthalocyanin compound prepared in the above-mentioned process to obtain a titanyl Phthalocyanin crystal.

(1) Preliminary Process for Acid Treatment

As a preliminary step for performing the acid treatment, it is preferable to perform a preliminary process for acid treatment, the titanylphthalocyanin compound obtained by the above-mentioned reactions is added into a water-soluble organic solvent, stirred for a predetermined time under heating, and then the solution is allowed to be left standing and stabilize for a predetermined time under a condition of lower temperature than the stirring treatment.

As water-soluble organic solvents used in the process prior to acid treatment, for example, one, two or more of alcohols such as methanol, ethanol and isopropanol, etc.; N,N-dimethylformamide, N,N-dimethylacetamide, propionic acid, acetic acid, N-methylpyrrolidone, and ethylene glycol, etc. are exemplified. A small amount of non-water soluble organic solvents may also be added into the water-soluble organic solvents.

Although conditions for stirring treatment in the preliminary process for acid treatment are not specially limited, it is preferable to perform a stirring treatment of about 1 to 3 hrs under a predetermined temperature condition within a temperature range of about 70 to 200° C.

Although conditions for stabilization treatment after the stirring treatment are also not specially limited, it is preferable to allow the solution to be left standing and stabilize for about 5 to 15 hrs under a predetermined temperature condition within a temperature range of about 10 to 50° C., preferably about 23±1° C.

(2) Acid Treatment Process

Next, it is preferable to perform the acid treatment process as follows.

That is, it is preferable that the titanyl phthalocyanin crystal obtained in the above-mentioned preliminary process for acid treatment is dissolved in an acid, then the solution is dropped to water and recrystallized, subsequently the obtained titanyl phthalocyanin crystal is washed in an aqueous alkali solution. More specifically, it is preferable that the obtained crude crystal is dissolved in an acid, this solution is dropped into water under ice cooling and then stirred for a predetermined time, further allowed to be left standing and recrystallized at a temperature within the range of 10 to 30° C. Subsequently, it is preferable that the crystal is not dried and stirred at 30 to 70° C. for 2 to 8 hrs in a non-aqueous solvent in the presence of water.

As acids used in the acid treatment, for example, concentrated sulfuric acid, trifluoroacetic acid and sulfonic acid, etc. are preferably used.

This is because impurities may be fully decomposed by using such strong acids in the acid treatment while the decomposition of the specific titanyl phthalocyanin crystal may be inhibited. Accordingly, a titanyl phthalocyanin crystal having a high-purity and excellent property in crystallinity may be obtained.

As aqueous alkali solutions used in the washing treatment, for example, common aqueous alkali solutions such as aqueous ammonia solution, aqueous sodium hydroxide solution, etc. may be preferably used.

This is because the ambience of the crystal may be made from acidity to neutrality by washing the specific titanyl phthalocyanin crystal after the acid treatment with such aqueous alkali solutions. As a result, the handling of the crystal in subsequent processes may be facilitated and the stability of the crystal may be improved.

As non-aqueous solvents for the stirring treatment, for example, halogen solvents such as chlorobenzen and dichloromethane, etc. are exemplified.

Third Embodiment

Third Embodiment is an electrophotographic photoconductor characterized in that a photosensitive layer is provided on a conductive substrate, and the photosensitive layer comprises the titanyl phthalocyanin crystal having the maximum peak at a Bragg angle 2 $\theta \pm 0.2° = 27.2°$ in the CuK$\alpha$ characteristic X-ray diffraction spectrum and one peak in a range of 270 to 400° C. other than a peak accompanied by the vaporization of adsorbed water in the differential scanning calorimetric analysis within the range of 0.1 to 50 part by weight with respect to 100 part by weight of a binder resin forming the photosensitive layer.

The contents already described in Embodiments 1 and 2 are omitted and the above-mentioned method for preparing titanyl phthalocyanin crystal is described as Third Embodiment hereinafter.

There are a single layer photoconductor and a laminated layer photoconductor in organic photoconductors, and the present invention is applicable to the both photoconductors.

1. Single Layer Photoconductor (1) Basic Construction

As shown in FIG. 1(a), a single layer photoconductor 10 is provided with a single photo-sensitive layer 14 on a conductive substrate 12. Such a photosensitive layer 14 comprises a specific titanyl phthalocyanin crystal as a charge generating agent, a charge transfer agent and a binder resin in the same layer.

The thickness of photosensitive layer is preferably set to a value within the range of 5 to 100 µm, and more preferably a value within the range of 10 to 50 µm.

As shown in FIG. 1(b), the single layer photoconductor may also be a photoconductor 10' formed with a barrier layer 16 in a range where characteristics of the photoconductor is not inhibited between the conductive substrate 12 and the photosensitive layer 14. As shown in FIG. 1(c), it may also be a photoconductor 10" formed with a protective layer 18 at the surface of photosensitive layer 14.

The single layer photoconductor preferably contains either a hole transfer agent or an electron transfer agent as a charge transfer agent contained in the photosensitive layer.

This is because characteristics of such a titanyl phthalocyanin crystal maybe fully obtained while its constitution may be performed stably and economically as compared with the laminated layer photoconductor described hereinafter. That is, an electrophotographic photoconductor having the good electric characteristics and image characteristics that may be fully obtained by the characteristics of a specific titanyl phthalocyanin crystal as a charge generating agent has may be constituted stably and economically.

The single layer photoconductor also preferably contains both a hole transfer agent and an electron transfer agent as charge transfer agents.

This is because characteristics of the specific titanyl phthalocyanin crystal may be fully obtained and a charge generated from such a titanyl phthalocyanin crystal may be transferred more efficiently in an exposure process. As a result, an electrophotographic photoconductor having better electric characteristics and image characteristics may be obtained.

(2) Charge Generating Agents (2)-1 Types

The charge generating agent used in the photoconductor as the present invention is characterized by the titanyl phthalocyanin crystal having the maximum peak at a Bragg angle 2 $\theta \pm 0.2° = 27.2°$ in the CuK$\alpha$ characteristic X-ray diffraction spectrum and one peak within the range of 270 to 400° C. other than a peak accompanied by the vaporization of adsorbed water in the differential scanning calorimetric analysis.

This is because an electrophotographic photoconductor having good electric characteristics and image characteristics may be obtained by using the titanyl phthalocyanin crystal that satisfies such conditions, is hard to change its crystal type and has stable characteristics even in an organic solvent as a charge generating agent In addition, details on such a specific titanyl phthalocyanin crystal are already described in Embodiments 1 and 2, therefore they are omitted to avoid repetition.

Other charge generating agents may also be used together to adjust the sensitivity region of the photoconductor. As other charge generating agents, they are not specially limited, for example, one, two or more of powders of inorganic photoconductive materials such as selenium, selenium-tellurium, selenium-arsenic, cadmiun sulfide and a-silicon, etc.; azo pigment, perylene pigment, anthanthrone pigment, conventional phthalocyanin pigment other than the titanyl phthalocyanin crystal of present invention, indigo pigment, triphenylmethane pigment, threne pigment, toluidine pigment, pyrazoline pigment, quinacridone pigment, and dithioketopyrrolopyrrole pigment, etc. are exemplified.

(2)-2 Added Amount

The amount of charge generating agent is characterized by setting to a value within the range of 0.1 to 50 part by weight with respect to 100 part by weight of binder resin described hereinafter.

This is because the charge generating agent may efficiently generates a charge when exposing it to the photoconductor by setting the amount of charge generating agent to a value within such a range.

That is, if the amount of such a charge generating agent falls short of 0.1 part by weight with respect to 100 part by weight of a binder resin, the generation of charge sometimes becomes insufficient to form an electrostatic latent image on the photoconductor. On the other hand, if the amount of such a charge generating agent exceeds 50 part by weight with respect to 100 part by weight of a binder resin, uniform distribution in a coating solution for a photosensitive layer sometimes becomes difficult.

Accordingly, the amount of charge generating agent with respect to 100 part by weight of a binder resin is preferably set to a value within the range of 0.5 to 30 part by weight.

In addition, when only the titanyl phthalocyanin crystal of present invention is used as a charge generating agent, the amount of charge generating agent is an amount of the titanyl phthalocyanin crystal; and when the titanyl phthalocyanin crystal of present invention is used together with other charge generating agents, the amount of charge generating agent is the total amount of both.

When the titanyl phthalocyanin crystal as the present invention is used together with other charge generating agents, the other charge generating agents are preferably added in a small amount in a range as long as not disturbing the above-mentioned effects of the titanyl phthalocyanin crystal. More specifically, the other charge generating agents are preferably added in a ratio within the range of 100 part by weight or less with respect to 100 part by weight of the titanyl phthalocyanin crystal.

(3) Binder Resins

As binder resins, for example, thermoplastic resins such as styrene polymer, styrene-butadiene copolymer, styrene-acrylonitrile copolymer, styrene-maleic acid copolymer, acrylic polymer, styrene-acrylic copolymer, polyethylene, ethylene-vinyl acetate copolymer, chlorinated polyethylene, polyvinyl chloride, polypropylene, polyvinyl-vinylacetate copolymer, polyester, alkyd resin, polyamide, polyurethane, polycarbonate, polyacrylate, polysulfone, diallylphthalate resin, ketone resin, polyvinyl butyral resin, and polyether resin, etc.; cross-linkable thermosetting resins such as silicone resin, epoxy resin, phenol resin, urea resin, melamine resin, etc.; photosetting resins such as epoxyacrylate, urethaneacrylate, etc. are exemplified. These binder resins may be used separately or used together by combining two or more.

(4) Electron Transfer Agent (4)-1 Types

As electron transfer agents, all conventional well-known various electron transferable compounds are available. Particularly, electron attractive compounds such as benzoquinone compounds, diphenoquinone compounds, naphthoquinone compounds, malononitrile, thiopyrane compounds, tetracyanoethylene, 2,4,8-trinitrothioxanthone, fluorenone compounds [e.g., 2,4,7-trinitro-9-fluorenone, etc.], dinitrobenzene, dinitroanthracene, dinitroacridine, nitroanthraquinone, succinic anhydride, maleic anhydride, dibromomaleic anhydride, 2,4,7-trinitrofluorenone imine compounds, ethylated fluorenone imine compounds, azafluorenone compounds, dinitropyridoquinazoline compounds, thioxanthene compounds, 2-phenyl-1,4-benzoquinone compounds, 2-phenyl-1,4-naphtoquinonecompounds, 5,12-napthtathenquinone compounds, α-cyanostilbene compounds, 4-nitrostilbene compounds and salts of an anion radical of benzoquinone compound and a cation, etc. are suitably used. They may be used separately or used together by combining two or more.

Among these compounds, all electron transfer agents represented by the following formulas (7) to (21) (ETM-1 to 15) have good fitting ability such as compatibility for the titanyl phthalocyanin crystal as the present invention, etc. and are suitably used as electron transfer agents excellent in electron transfer capability.

(ETM-1)

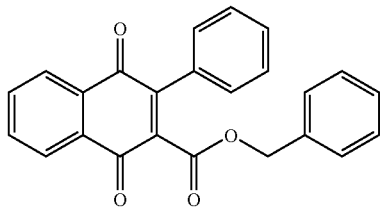

(7)

(ETM-2)

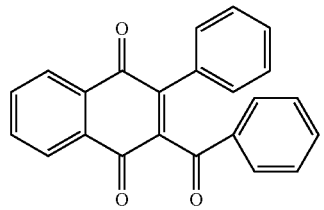

(8)

(ETM-3)

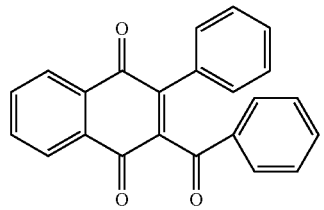

(9)

(ETM-4)

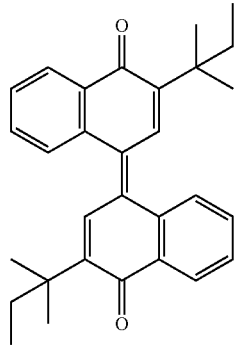

(10)

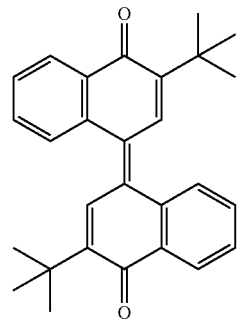

-continued
(ETM-5) (11)
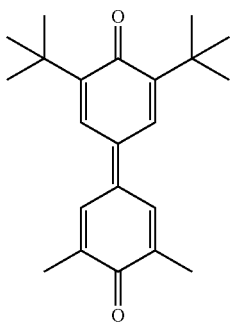
(ETM-6) (12)
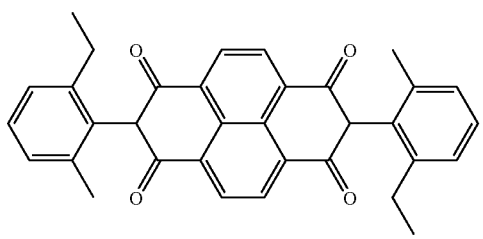
(ETM-7) (13)
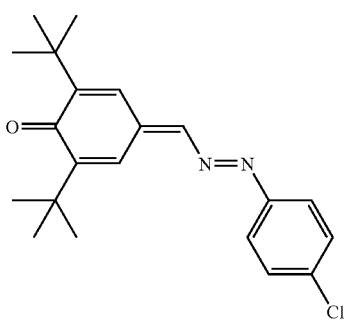
(ETM-8) (14)
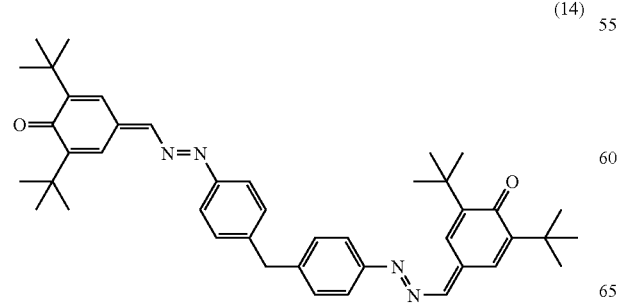
-continued
(ETM-9) (15)
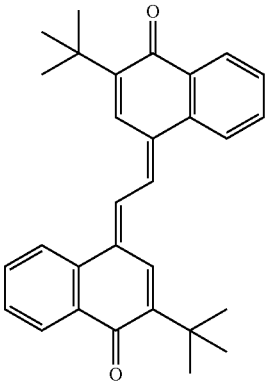
(ETM-10) (16)
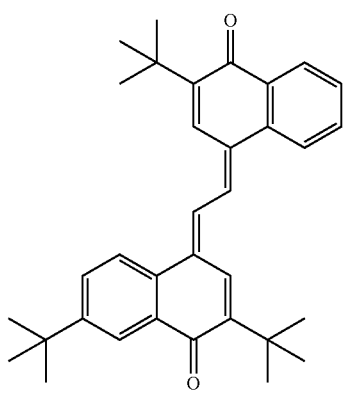
(ETM-11) (17)
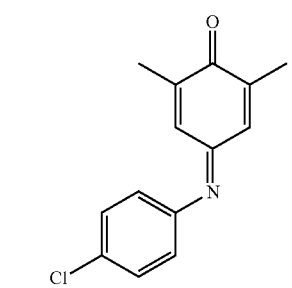
(ETM-12) (18)
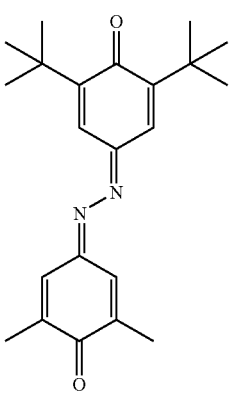

-continued (ETM-13)

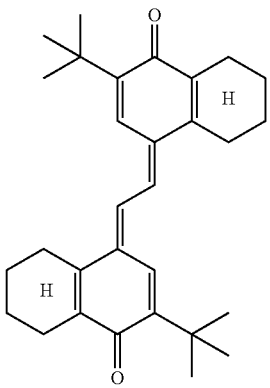

(ETM-14)

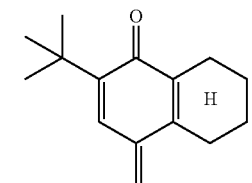

(ETM-15)

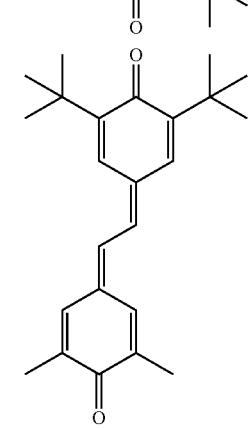

(4)-2 Added Amount

The amount of electron transfer agent is preferably set to a value within the range of 20 to 500 part by weight with respect to 100 part by weight of a binder resin and more preferably a value within the range of 30 to 200 part by weight with respect to 100 part by weight of the binder resin. When an electron transfer agent and a hole transfer agent described hereinafter are used together, the total amount is preferably set to a value within the range of 20 to 500 part by weight and more preferably a value in a range of 30 to 200 part by weight with respect to 100 part by weight of the binder resin.

When an electron transfer agent and a hole transfer agent described later are used together, the amount of electron transfer agent is preferably set to a value within the range of 10 to 100 part by weight with respect to 100 part by weight of the hole transfer agent.

(5) Hole Transfer Agent (5)-1 Types

As hole transfer agent, all conventional well-known various electron transferable compounds are usable. Particularly, benzidine compounds, phenylenediamine compounds, naphthylenediamine compounds, phenantolylenediamine compounds, oxadiazole compounds [e.g., 2,5-di(4-methylaminophenyl)-1,3,4-oxadiazole, etc.], styryl compounds [e.g., 9-(4-diethylamino-styryl)anthracene, etc.], carbazole compounds [e.g., poly-N-vinylcarbazole, etc.], organopolysilane compounds, pyrazoline compounds [e.g., 1-phenyl-3-(p-dimethylaminophenyl)pyrazoline, etc.], hydrazone compounds, triphenylamine compounds, indole compounds, oxazole compounds, isooxazole compounds, thiazole compounds, thiadizole compounds, imidazole compounds, pyrazole compounds, triazole compounds, butadiene compounds, pyrenehydrazone compounds, acrolein compounds, carbazolehydrazone compounds, quinoline-hydrazone compounds, stilbene compounds, stilbene-hydrazone compounds, and diphenyldiamine compounds, etc. are preferably used. They may be used separately or used together by combining two or more.

Among these compounds, all compounds represented by the following formulas (22) to (46) (HTM-1 to 25) have good fitting ability such as compatibility for the titanyl phthalocyanin crystal and are suitably used as hole transfer agents excellent in hole transfer capability.

(HTM-1)

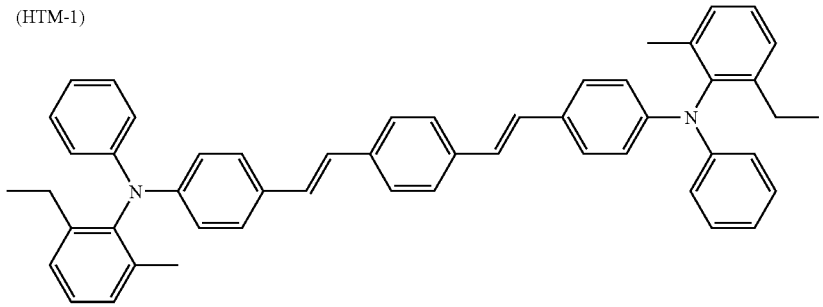

(22)

-continued
(HTM-2)
(23)
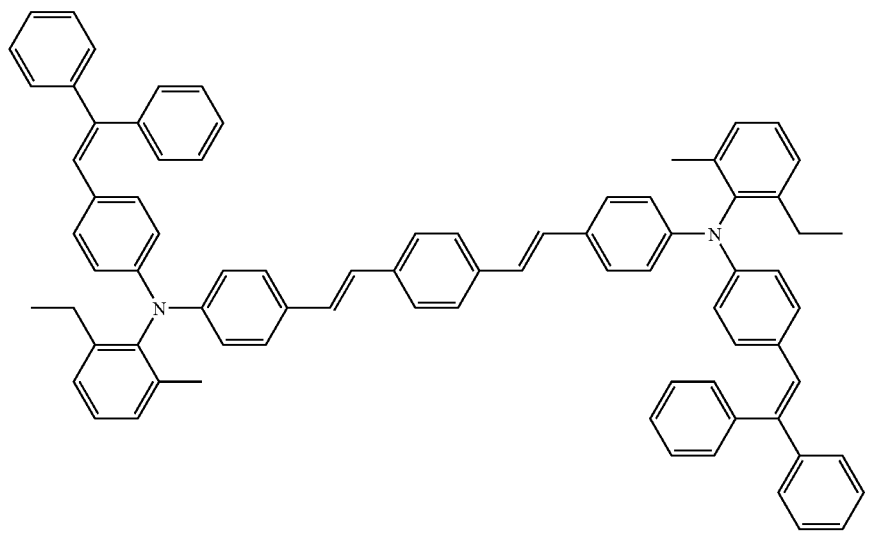
(HTM-3)
(24)
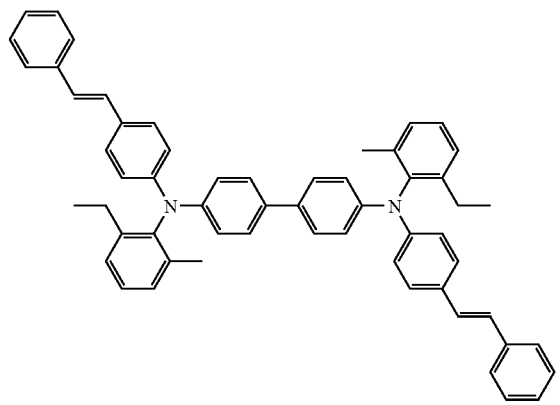
(HTM-4)
(25)
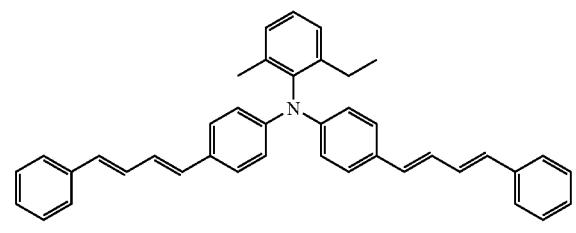
(HTM-5)
(26)
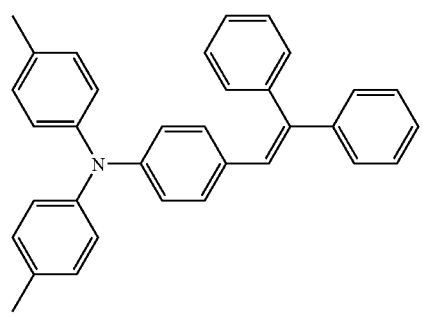
(HTM-6)
(27)
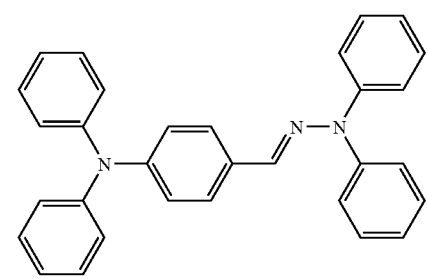

-continued
(HTM-7) (28)
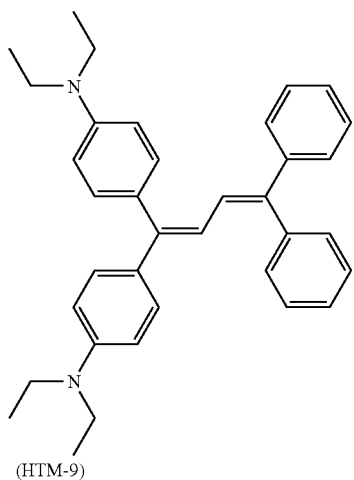
(HTM-8) (29)
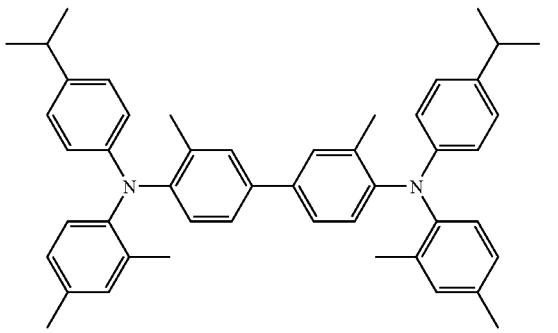
(HTM-9) (30)
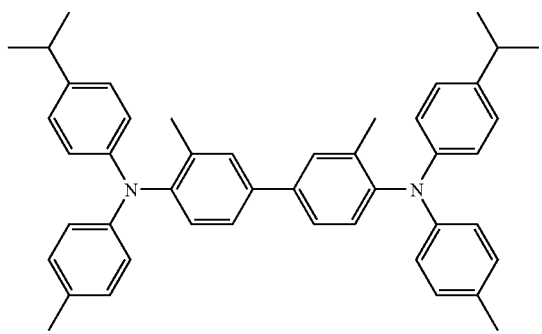
(HTM-10) (31)
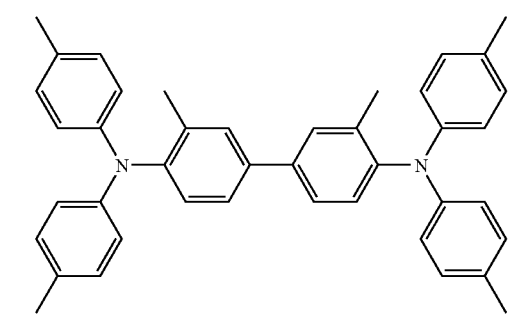
(HTM-11) (32)
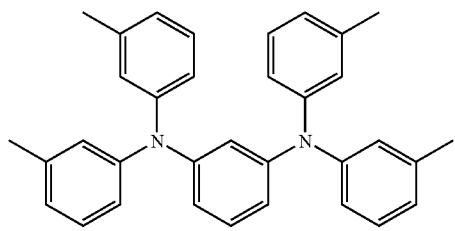
(HTM-12) (33)
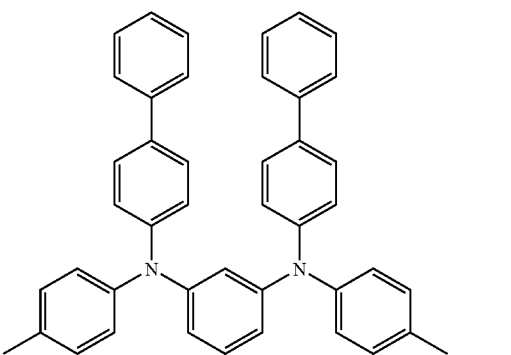
(HTM-13) (34)
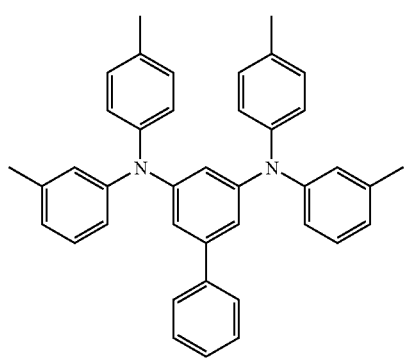
(HTM-14) (35)
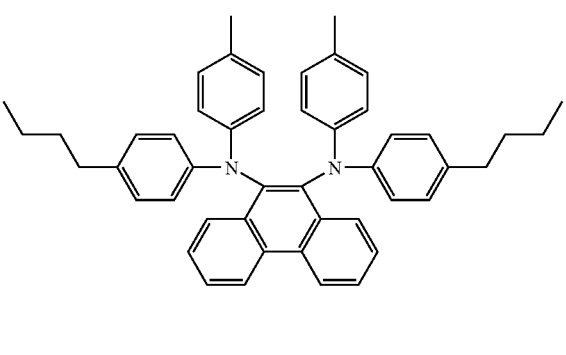

(HTM-15)
(36)
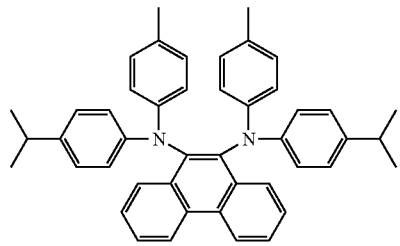
(HTM-16)
(37)
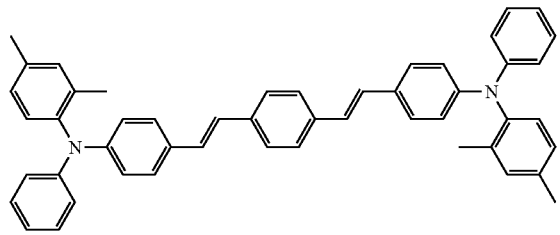
(HTM-17)
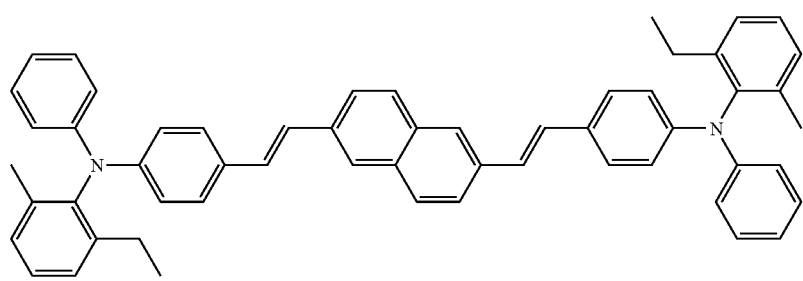
(38)
(HTM-18)
(HTM-19)
(39)
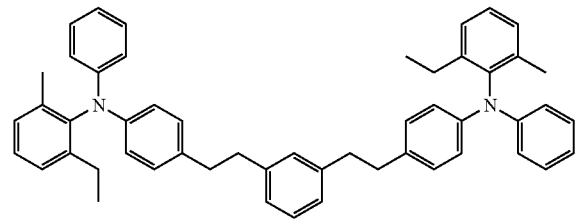
(40)
(HTM-20)
(HTM-21)
(41)
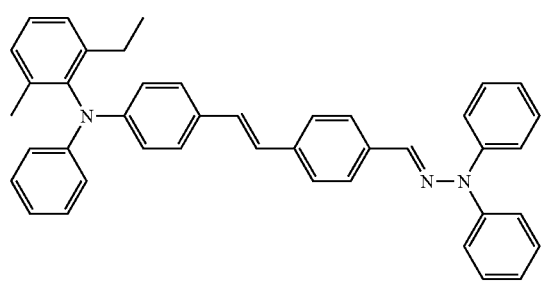
(42)
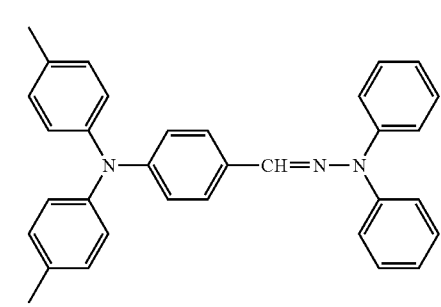

(HTM-22) (43)

(HTM-23) (44)

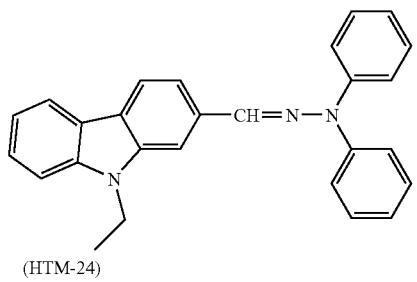
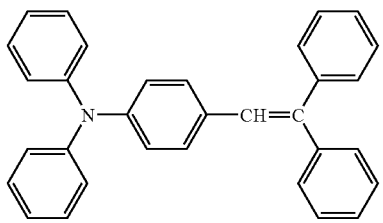

(HTM-24) (45)

(HTM-25) (46)

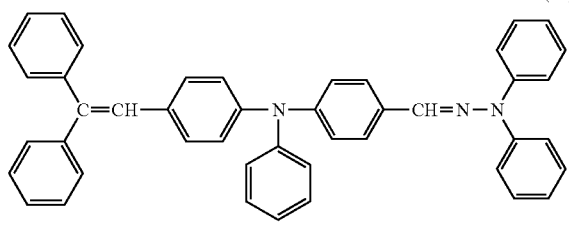

(5)-2 Added Amount

The amount of hole transfer agent is preferably set to a value within the range of 20 to 500 part by weight with respect to 100 part by weight of a binder resin and more preferably as a value in a range of 30 to 200 part by weight with respect to 100 part by weight of the binder resin. When a hole transfer agent and the electron transfer agent described above are used together, the total amount is preferably set to a value within the range of 20 to 500 part by weight and more preferably a value within the range of 30 to 200 part by weight with respect to 100 part by weight of the binder resin.

(6) Other Additives

In addition to the components described above, various additives such as sensitizer, fluorene compound, ultraviolet absorbent agent, plasticizer, surfactant, leveling agent, etc. may also be added in the photosensitive layer. For example, a sensitizer such as terphenyl, halonaphthoquinones, and acenaphthylene, etc. may be used together with the charge generating agent to improve the sensitivity of photoconductor.

(7) Conductive Substrates

As conductive substrates formed on the photosensitive layer described above, various materials having conductivity may be used. Conductive substrates formed by metals such as iron, aluminum, copper, tin, platinum, silver, vanadium, molybdenum, chromium, cadmium, titanium, nickel, palladium, indium, stainless steel, and brass, etc., substrates made of a plastic material which the above metal is vapor-deposited or laminated, or glass substrates coated with aluminum iodide, tin oxide, and indium oxide, etc. are exemplified.

That is, the substrate may have conductivity in their own or their surface may have conductivity. The conductive substrates preferably have sufficient mechanical strength in use.

The shape of conductive substrates may be any of sheet or drum-type, etc. in conformity to the structure of used image forming device.

(8) Manufacturing Method

In constituting a single layer photoconductor, a binder resin, a charge generating agent, a hole transfer agent and, if necessary, an electron transfer agent are added into a solvent, dispersed and mixed to prepare a coating solution for a photosensitive layer. That is, when a single layer photoconductor is formed by coating process, a titanyl phthalocyanin crystal as a charge generating agent, a charge transfer agent and a binder resin, etc. may be dispersed and mixed with a proper solvent by a well-known method, e.g., roller mill, ball mill, attritor, paint shaker, and supersonic disperser, etc. to prepare a dispersion, then applied and dried by a well-known means.

As solvents for preparing the coating solution for the photosensitive layer, one, two or more of tetrahydrofuran, dichloromethane, toluene, 1,4-dioxane, and 1-methoxy-2-propanol, etc. are exemplified.

Furthermore, a surfactant or a leveling agent, etc. may also be added to improve the dispersibility of the charge transfer agent or charge generating agent and the smoothness of surface of the photosensitive layer in the coating solution for the photosensitive layer.

2. Laminated Photoconductor (1) Basic Construction

Figure 2:
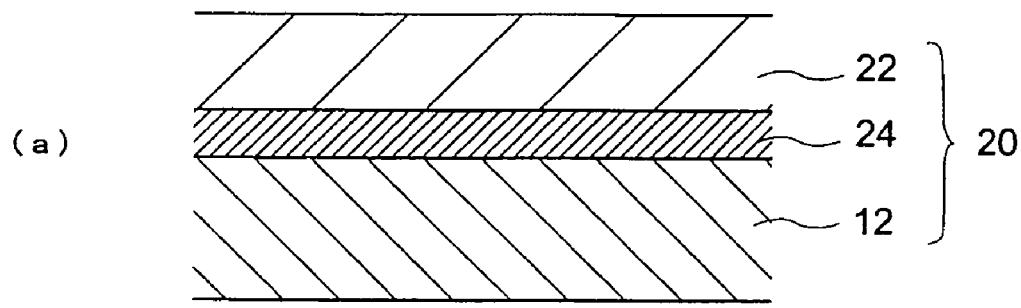
FIGS. 2 (a) to (c) are a schematic view for illustrating the composition of a laminated layer type photoconductor.
Figure 2:
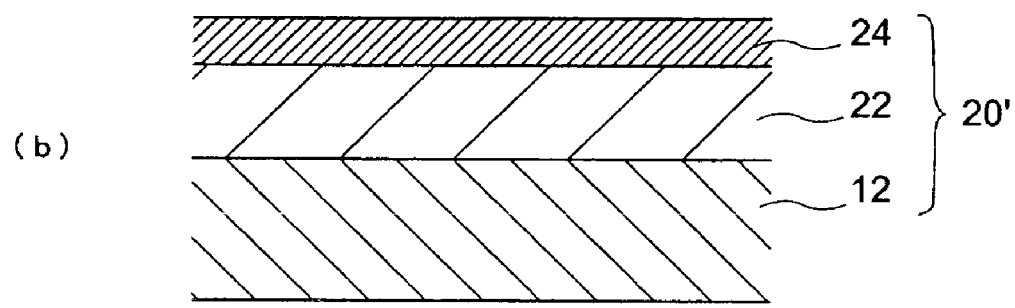
Figure 2:
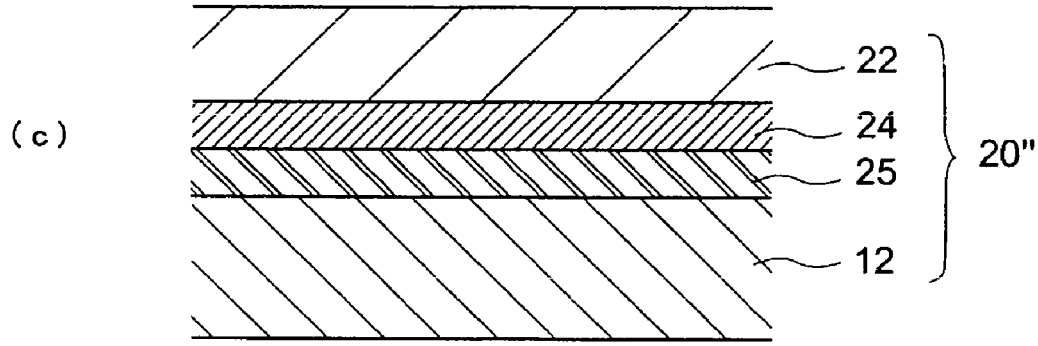

As shown in FIG. 2, a laminated layer photoconductor 20 may be constituted by forming a charge generating layer 24 containing a specific titanyl phthalocyanin crystal as charge generating agent on a substrate 12 by a deposition or coating means and then applying a coating solution for a photosensitive layer containing a charge generating agent, etc. and a binder resin on this charge generating layer and drying to form a charge transfer layer 22.

In contrast with the above construction, as shown in FIG. 2, the charge transfer layer 22 may be formed on the substrate 12 and the charge generating layer 24 may be formed thereon.

However, the charge generating layer 24 has an extremely thin film thickness as compared with the charge transfer layer 22, therefore, as shown in FIG. 2, the charge transfer layer 22 is more preferably formed on the charge generating layer 24 for its protection.

Either a hole transfer agent or a electron transfer agent is preferably contained in the charge transfer layer 22.

By such a construction, a photosensitive layer may be constructed with the above-mentioned titanyl phthalocyanin crystal, a binder resin with good fitting ability for such a titanyl phthalocyanin crystal and a solvent, etc. with no need of especially considering the fitting ability with a charge transfer agent. Accordingly, characteristics of such a titanyl phthalocyanin crystal may be more effectively obtained and an electrophotographic photoconductor excellent in electric characteristics and image characteristics may be stably prepared.

Whether this laminated layer photoconductor becomes positively or negatively charged type is selected according to the order of forming the above-mentioned charge generating layer and charge transfer layer and the type of charge transfer agent used in the charge transfer layer. For example, as shown in FIG. 2, when the charge generating layer 24 is formed on the substrate 12 and the charge transfer layer 22 is formed thereon and when a hole generating agent such as amino compound derivative or stilbene derivative is used as charge transfer agent in the charge transfer layer 22, the photoconductor becomes the negatively charged type. In this case, a charge transfer agent may also be contained in the charge generating layer 24. Then, if the photoconductor is such a laminated type electrophotographic photoconductor, the residual potential of photoconductor is greatly reduced and the sensitivity may be improved.

The thickness of photosensitive layer in the laminated layer photoconductor is preferably set to a value within the range where the thickness of charge generating layer is 0.01 to 5 μm, and more preferably a value within the range where the thickness of charge generating layer is 0.1 to 3 μm.

The same substrate as the above-mentioned single layer photoconductor may be used as a substrate formed with such a photosensitive layer.

As shown in FIG. 2, an intermediate layer 25 is preferably formed on such a substrate 12 before the photosensitive layer is formed. This is because the substrate side charge is prevented from being easily injected into the photosensitive layer, the photosensitive layer is strongly bound on the substrate 12 and surface defects at the substrate 12 maybe covered and made smooth by providing such an intermediate layer 25.

(2) Types

When the laminated layer photoconductor of the present invention is constituted, the types of charge generating agent, hole generating agent and binder resin and other additives may be basically the same contents as the above-mentioned single layer photoconductor.

(3) Added Amount

The amount of charge generating agent used in the laminated layer photoconductor of the present invention is preferably set to a value within the range of 5 to 1,000 part by weight and more preferably a value within the range of 30 to 500 part by weight with respect to 100 part by weight of a binder resin constructing the charge generating layer.

The charge transfer agent and the binder resin constructing the charge transfer agent may be mixed in various ratios within the range of no inhibition of charge transfer and no crystallization, but the amount of charge transfer agent is preferably set to a value within the range of 10 to 500 part by weight and more preferably a value within the range of 25 to 200 part by weight with respect to 100 part by weight of the binder resin so that a charge generated in the charge generating layer may be easily transferred by illumination.

In addition, the amount of charge transfer agent represents a total of the amount of charge transfer agent and the amount of hole transfer agent, when only either charge transfer agent or hole transfer agent is added, it represents only the amount of added charge transfer agent.

(4) Manufacturing Methods

In the methods for manufacturing the charge generating layer, charge transfer layer and intermediate layer, a binder resin is dispersed and other additives are dispersed and mixed with a proper dispersion medium by a well-known method to prepare a coating solution for a photosensitive layer, respectively, then the coating solution is applied by a well-known method and dried, respectively.

EXAMPLES

Hereinafter, the present invention will be concretely described with reference to examples thereof.

Example 1

1. Preparation of Titanyl Phthalocyanin

To an argon-substituted flask, 22 g (0.17 mole) of o-phthalonitrile, 25 g (0.073 mole) of titanium tetrabutoxide, 2.28 g (0.038 mole) of urea and 300 g of quinone were added and heated up to 150° C. while stirring. Next, the mixture was heated up to 215° C. while removing a vapor generated from the reaction system to the outside, then stirred and reacted for additional 2 hrs while keeping this reaction temperature.

After the reaction finished, the reaction mixture was withdrawn from the flask at a time of cooling it to 150° C., filtered with a glass filter, the resultant solid was washed with N,N-dimethylformamide and methanol in order, vacuum dried and 24 g of a blue-purple solid was obtained.

2. Preparation for Titanyl Phthalocyanin Crystal (1) Preliminary Process for Acid Treatment 10 g of the blue-purple solid obtained in the above-mentioned preparation of the titanyl phthalocyanin was added in 100 mL of N,N-dimethylformamide, heated up to 130° C. while stirring and then stirred for 2 hrs. Next, the heating was stopped after a lapse of 2 hrs, the mixture was cooled to 23±1° C., then the stirring was stopped, the liquid was allowed to be left standing for 12 hrs in this state to perform a stabilization treatment. Subsequently, the stabilized liquid was filtered with a glass filter, the obtained solid was washed with methanol, vacuum dried and 9.83 g of a crude crystal of titanyl phthalocyanin compound was obtained.

(2) A Process for Acid Treatment 5 g of the crude crystal of titanyl phthalocyanin compound obtained in the above-mentioned preliminary process of acid treatment was added to 100 ml of concentrated sulfuric acid and dissolved. Next, the solution was dropped into water under ice cooling and then stirred at room temperature for 15 min, further allowed to be left standing near 23±1° C. for 30 min and recrystallized. Next, the above-mentioned liquid was filtered with a glass filter, the obtained solid was washed with water until the wash solution became neutral, then dispersed in 200 ml of chlorobenzen, heated to 50° C. and stirred for 10 hrs in a state that water existed without being dried. Subsequently, the liquid was filtered with a glass filter, and then the obtained solid was vacuum dried at 50° C. for 5 hrs and 4.1 g of a non-substituted titanyl phthalocyanin crystal (a blue powder) represented by the formula (3) was obtained.

3. Optical Characteristics and Thermal Characteristics (1) Measurement of CuKα Characteristic X-Ray Diffraction Spectrum 0.3 g of the obtained titanyl phthalocyanin within 60 min after preparation was dispersed in 5 g of tetrahydrofuran, kept in a closed system for 7 days under conditions of temperature 23±1° C. and relative humidity 50 to 60% RH, and then packed in a sample holder of an X-ray diffractometer (RINT1100 made by Rigaku Denki, Inc.) and measured.

Measuring conditions were as follows for both initial measurement and re-measurement.

Figure 3:
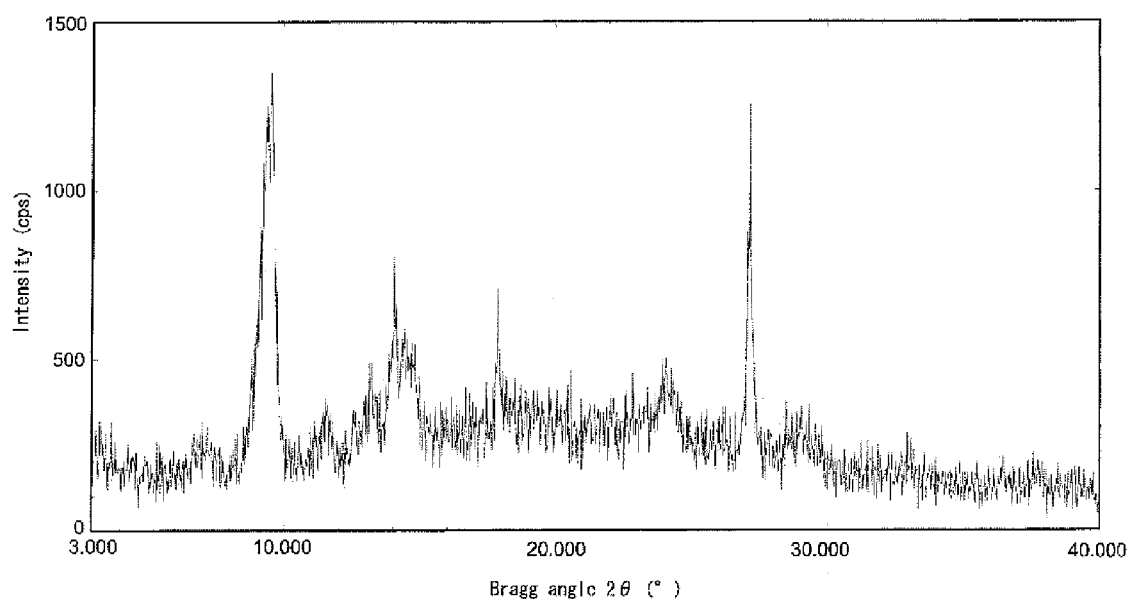
FIG. 3 is a spectrum for showing a CuKα characteristic X-ray diffraction of a titanyl phthalocyanin crystal (after stored for 7 days in tetrahydrofuran) used in Example 1 (Examples 2 to 21 and 64 to 70).

X-ray tube ball: Cu
Tube voltage: 40 kV
Tube current: 30 mA
Start angle: 3.0°
Stop angle: 40.0°
Scanning speed: 10°/min The CuKα characteristic X-ray diffraction spectrum was evaluated by the following criteria. The obtained results are shown in Table 1 and FIG. 3.

o: A strong peak exists at a Bragg angle $2\theta \pm 0.2° = 27.2°$ and no peaks at 7.2° and 26.2°.

x: A small peak at a Bragg angle $2\theta \pm 0.2° = 27.2°$ and a strong peak at 26.2°.

(2) Differential Scanning Calorimetric Analysis

Figure 4:
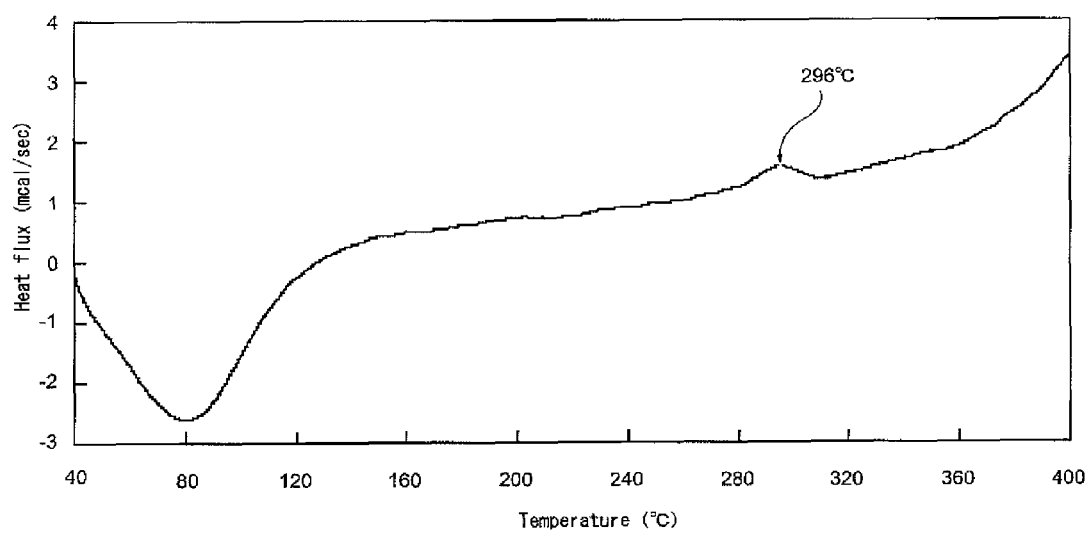
FIG. 4 is a chart for showing a differential scanning calorimetric analysis of a titanyl phthalocyanin crystal used in Example 1 (Examples 2 to 21 and 64 to 70).

The differential scanning calorimetric analysis of the obtained titanyl phthalocyanin crystal was performed by a differential scanning calorimeter (TAS-200 model, DSC8230D made by Rigaku Denki, Inc.). Measurement conditions are as follows. A differential scanning calorimetric analysis chart is shown in FIG. 4, but one peak was observed at 296° C.

Sample pan: aluminum
Heating rate: 20° C./min

4. Constitution of Single Layer Photoconductor 5 part by weight of the obtained titanyl phthalocyanin crystal, 70 part by weight of a hole transfer agent represented by the formula (22) (HTM-1), 30 part by weight of an electron transfer agent represented by the formula (7) (ETM-1) and 100 part by weight of a polycarbonate (TS2020 made by Teijin Chemical, Ltd.) as a binder resin as well as 800 part by weight of tetrahydrofuran were mixed and dispersed together by a supersonic disperser and a coating solution for single layer photosensitive layer was the prepared.

Next, this coating solution for the photosensitive layer was applied to an aluminum drum-type support of 30 mm in diameter and 254 mm in total length by dip coating process within about 60 min immediately after preparing. Subsequently, an electrophotographic photoconductor having a single layer photosensitive layer of 25 μm in film thickness was constituted by heat treatment at 130° C. for 30 min.

The above-mentioned coating solution for the photosensitive layer was stored for 7 days in a closed system at temperature 23±1° C. and relative humidity 50 to 60% RH. Next, it was dispersed again by a supersonic disperser and then applied to an aluminum drum-type support of 30 mm in diameter and 254 mm in total length as conductive substrate by using dip coating process in the same manner. Subsequently, a single layer photoconductor of 25 μm in film thickness was constituted by heat treatment at 130° C. for 30 min.

5. Evaluation of Single Layer Photoconductor (1) Electric Characteristics

The bright potential Vr1 (V) of the photosensitive layer formed with a coating solution for a photosensitive layer for the single layer photosensitive layer immediately after preparation and the dark potential Vr2 (V) of the photosensitive layer formed with a coating solution for a photosensitive layer after 7 day storage were measured under the following conditions, respectively.

That is, the prepared electrophotographic photoconductor was charged on a surface potential +700 V by corona discharge using a drum sensitivity tester under a normal temperature condition and a normal humidity condition(temperature: 20° C. and humidity: 60%).

Next, a light of light intensity 8 μm/cm², which was monochromatized to a wavelength 780 nm and a half-value width 20 nm, was exposed for 1.5 sec at the surface of the electrophotographic photoconductor with a band-pass filter while the surface potential after 0.5 sec from the start of exposure was measured as bright potential. Then, $\Delta Vr (V) (=Vr2-Vr1)$ was calculated and evaluated by the following criteria as an electric characteristic of the photosensitive layer from the absolute value of bright potential change. The obtained result is shown in Table 1.

+ (excellent): The absolute value of bright potential change falls short of 10 V.

− (poor): The absolute value of bright potential change is 10 V or above.

(2) Image Fogging

Image formation was performed under a high temperature condition and a high humidity condition (temperature: 35° C. and humidity: 85%) by a printer FS1010 (made by Kyocera, Ltd.) loaded with an electrophotographic photoconductor which was constituted with the coating solution for the photosensitive layer after 7 day storage to print ISO 5% continuous 200,000 pieces and ISO 2% intermittent 50,000 pieces.

Next, the density of non-printing area in printing ISO 5% continuous 200,000 pieces and ISO 2% intermittent 50,000 pieces was measured by a spectrophotometer SpectroEye (manufactured by GretagMacbeth, Ltd.), and the image fogging was estimated by the following criteria. The obtained result is shown in Table 1.

++ (excellent): The density of non-printing area falls short of 0.008 and no any poor fogging was observed.

+ (acceptable): The density of non-printing area is more than 0.008 and falls short of 0.015 and a little poor fogging was observed.

− (poor): The density of non-printing area is more than 0.015 and remarkable poor fogging was observed.

Examples 2 to 21

Effects of the types of hole transfer agents and electron transfer agents were investigated in Examples 2 to 21. That is, the preparation of titanyl phthalocyanin crystals and the constitution of single layer photoconductors were performed and evaluated in the same manner as Example 1, respectively except that hole transfer agents (HTM-1 to 7) and electron transfer agents (ETM-1 to 3) as shown in Table 1 were used in place of the hole transfer agent (HTM-1) and the electron transfer agent (ETM-1) used in Example 1 in constituting photoconductors, respectively. The obtained results are shown in Table 1.

A titanyl phthalocyanin crystal used in Examples 2 to 21 is same as in Example 1, therefore the CuKα characteristic X-ray diffraction spectrum and the differential scanning calorimetric analysis chart are same as in Example 1.

Examples 22 to 42

An effect of the amount of urea used in preparing titanyl phthalocyanin compounds was investigated in Examples 22 to 42.

Figure 5:
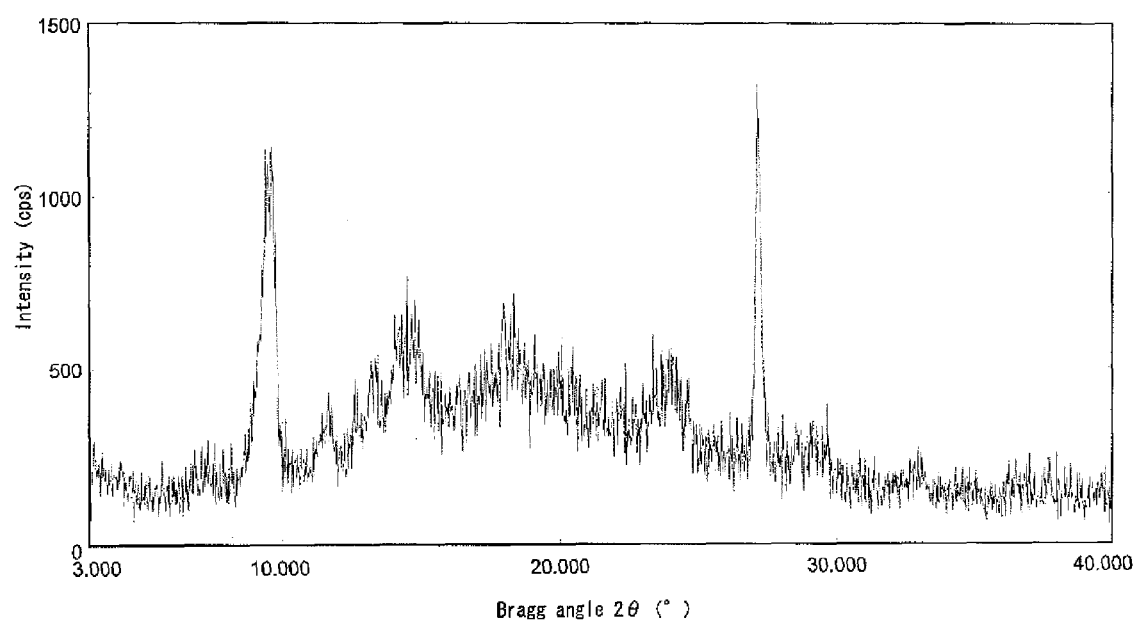
FIG. 5 is a spectrum for showing a CuKα characteristic X-ray diffraction of a titanyl phthalocyanin crystal (after stored for 7 days in tetrahydrofuran) used in Example 22 (Examples 23 to 42 and 71 to 77).
Figure 6:
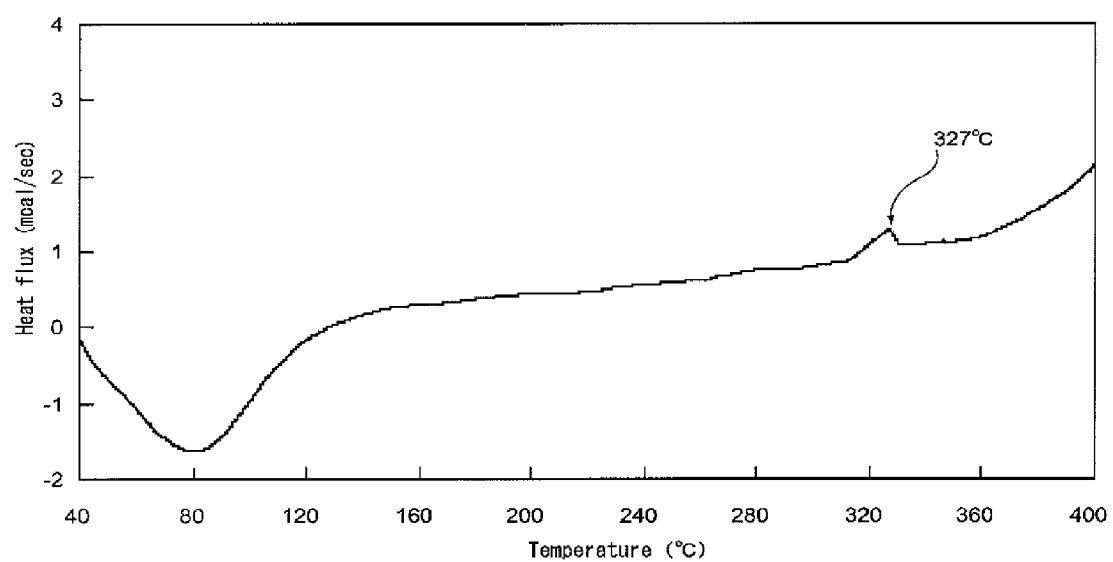
FIG. 6 is a chart for showing a differential scanning calorimetric analysis of a titanyl phthalocyanin crystal used in Example 22 (Examples 23 to 42 and 71 to 77).

That is, the preparation of titanyl phthalocyanin crystals and the constitution of single layer photoconductors were performed and evaluated in the same manner as Examples 1 to 21, respectively except that the amount of urea used in preparing titanyl phthalocyanin compounds was 5.70 g (0.095 mole) in place of 2.28 g (0.038 mole) used in Examples 1 to 21, respectively. The obtained results are shown in Table 1, FIG. 5 and FIG. 6.

Examples 43 to 63

An effect of the amount of urea used in preparing titanyl phthalocyanin compounds was investigated in Examples 43 to 63.

Figure 7:
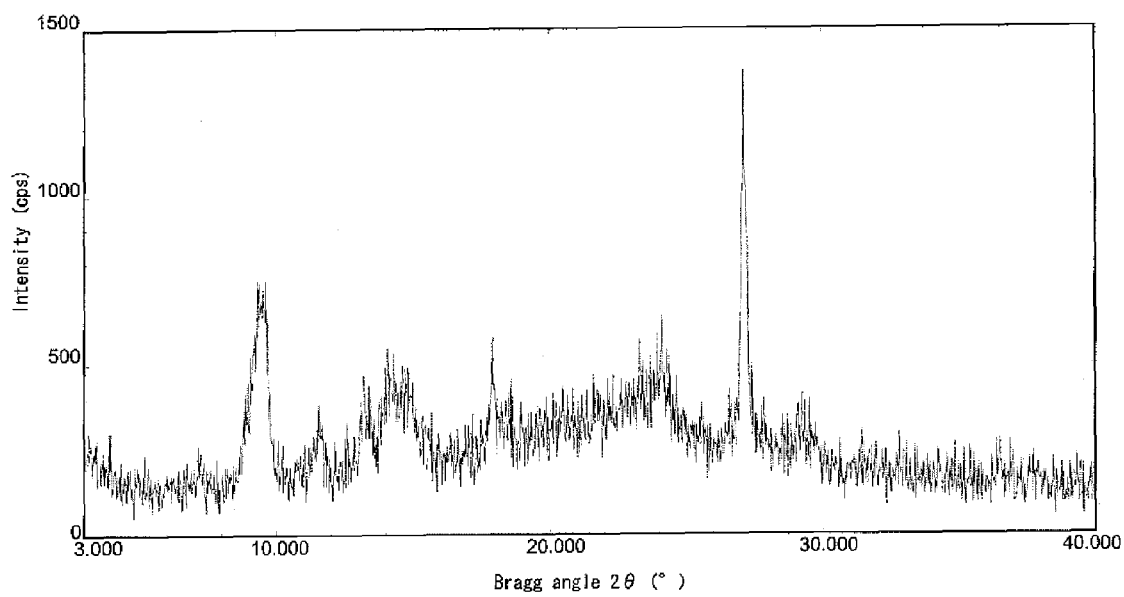
FIG. 7 is a spectrum for showing a CuKα characteristic X-ray diffraction of a titanyl phthalocyanin crystal (after stored for 7 days in tetrahydrofuran) used in Example 43 (Examples 44 to 63 and 78 to 84).
Figure 8:
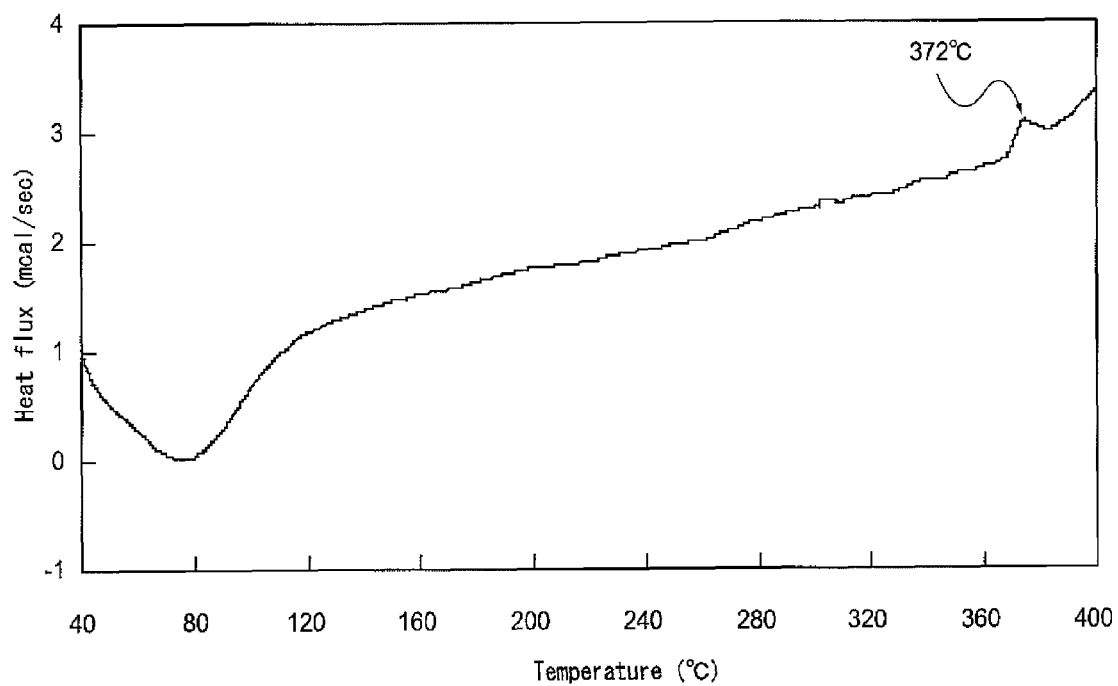
FIG. 8 is a chart for showing a differential scanning calorimetric analysis of a titanyl phthalocyanin crystal used in 43 (Examples 44 to 63 and 78 to 84).

That is, the preparation of titanyl phthalocyanin crystals and the constitution of single layer photoconductors were performed and evaluated in the same manner as Examples 1 to 21, respectively except that the amount of urea used in preparing titanyl phthalocyanin compounds was 8.40 g (0.14 mole) in place of 2.28 g (0.038 mole) used in Examples 1 to 21, respectively. The obtained results are shown in Table 1, FIG. 7 and FIG. 8.

Comparative Examples 1 to 21

Figure 9:
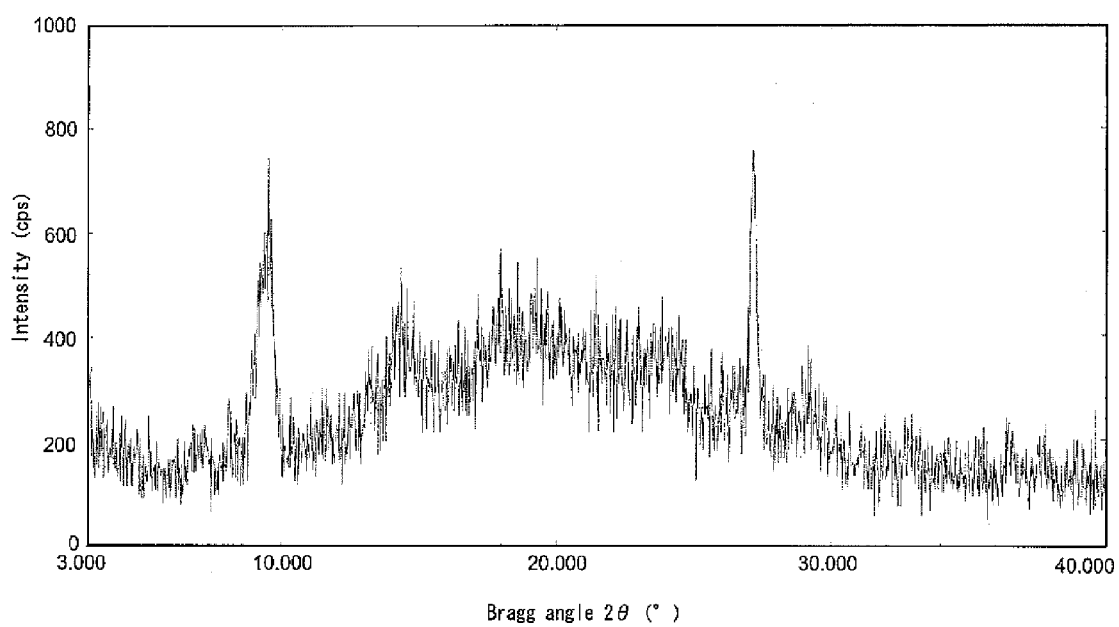
FIG. 9 is a spectrum for showing a CuKα characteristic X-ray diffraction of a titanyl phthalocyanin crystal (after stored for 7 days in tetrahydrofuran) used in Comparative Example 1 (Comparative Examples 2 to 21 and 106 to 112).
Figure 10:
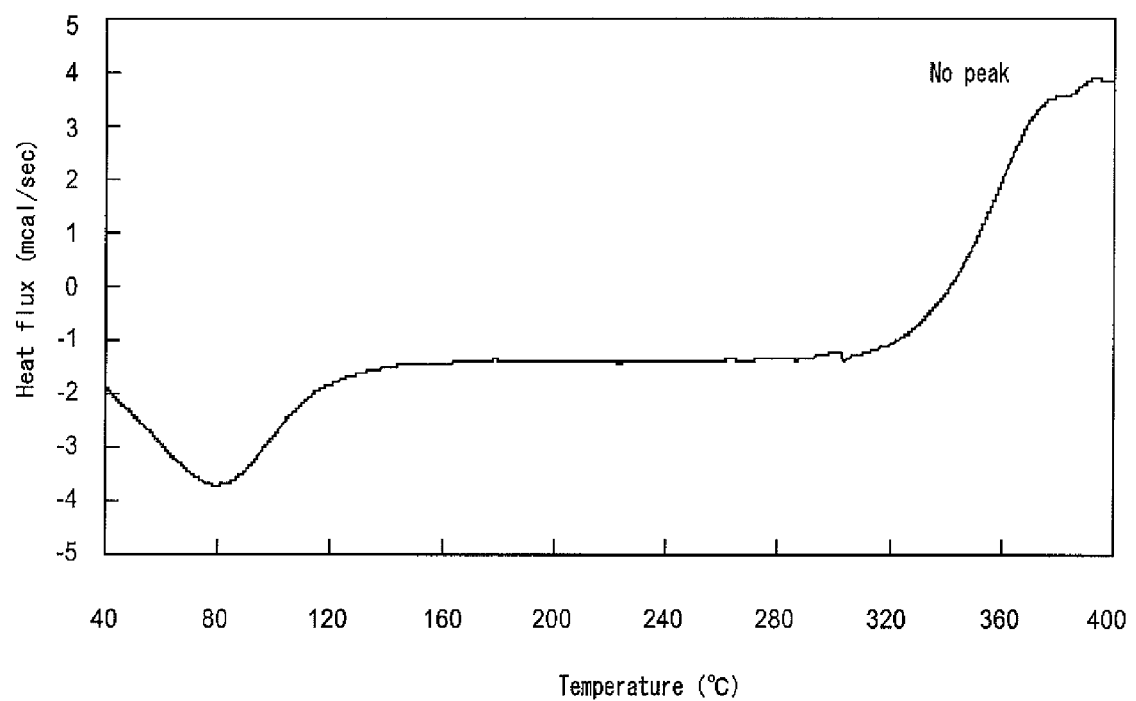
FIG. 10 is a chart for showing a differential scanning calorimetric analysis of a titanyl phthalocyanin crystal used in Comparative Example 1 (Comparative Examples 2 to 21 and 106 to 112).

The preparation of titanyl phthalocyanin crystals and the constitution of single layer photoconductors were performed and evaluated in the same manner as Examples 1 to 21, respectively except that urea was not used in preparing titanyl phthalocyanin compounds in Comparative examples 1 to 21, respectively. The obtained results are shown in Table 2, FIG. 9 and FIG. 10.

Comparative Examples 22 to 42

Figure 11:
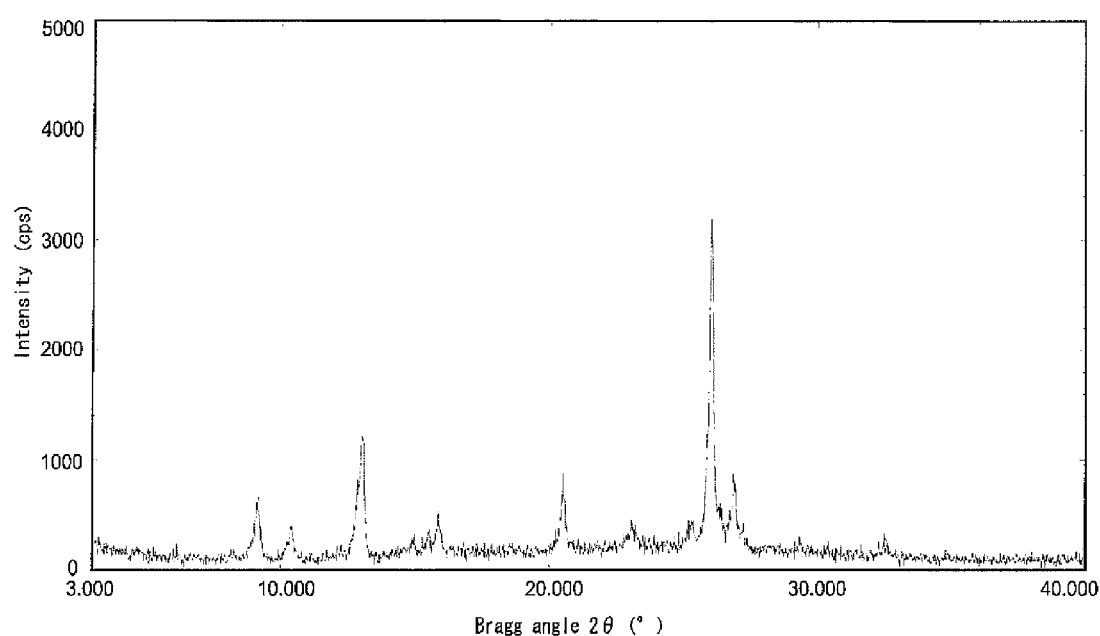
FIG. 11 is a spectrum for showing a CuKα characteristic X-ray diffraction of a titanyl phthalocyanin crystal (after stored for 7 days in tetrahydrofuran) used in Comparative Example 22 (Comparative Examples 23 to 42 and 113 to 119).
Figure 12:
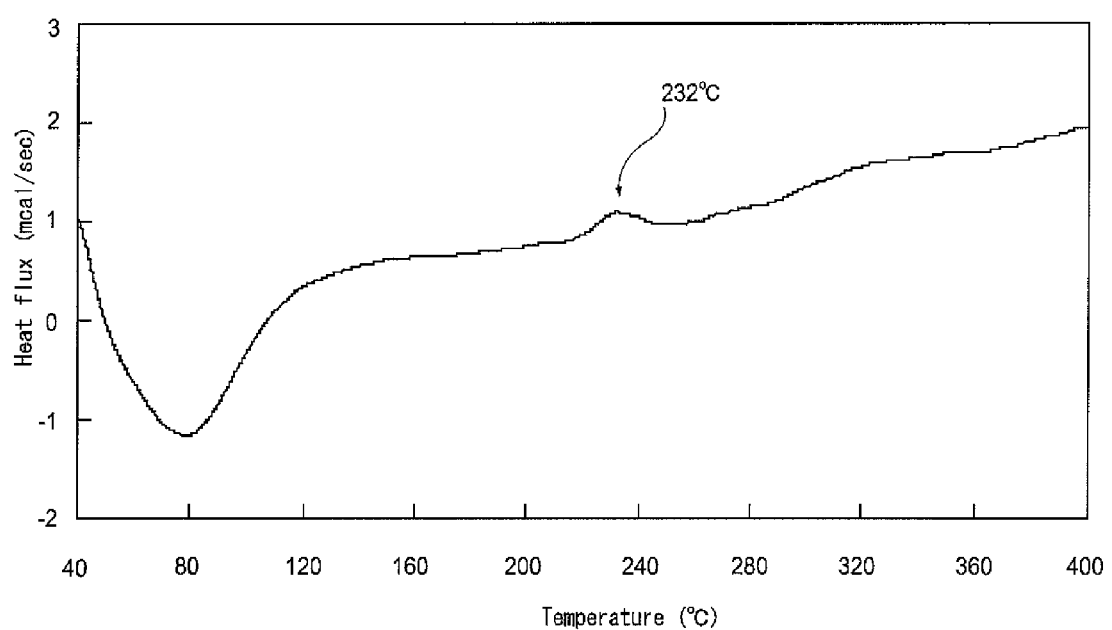
FIG. 12 is a chart for showing a differential scanning calorimetric analysis of a titanyl phthalocyanin crystal used in Comparative Example 22 (Comparative Examples 23 to 42 and 113 to 119).

The preparation of titanyl phthalocyanin crystals and the constitution of single layer photoconductors were performed and evaluated in the same manner as Examples 1 to 21, respectively except that 2 g of a non-crystalline titanyl phthalocyanin compound in the preliminary step of acid treatment in Comparative examples 1 to 21 was put into a glass beaker and dimethylene glycol dimethylether was added until the total amount became 200 mL in preparing the titanyl phthalocyanin crystal, respectively, subsequently it was stirred at 23±1° C. for 24 hrs to give a titanyl Phthalocyanin crystal in Comparative examples 22 to 42. The obtained results are shown in Table 2, FIG. 11 and FIG. 12.

Comparative Examples 43 to 63

In Comparative examples 43 to 63, 5 g of a crude non-crystalline titanyl phthalocyanin crystal after the preliminary process of acid treatment in Comparative examples 1 to 21 was added to 100 ml of a mixed solvent of dichloromethane and trifluoroacetic acid (volume ratio 4:1) and dissolved. Next, this solution was dropped into a mixed lean solvent of methanol and water (volume ratio 1:1), then stirred at room temperature for 15 min, allowed to be left standing and recrystallized at 23 ±1° C. for 30 min. Next, the above-mentioned liquid was filtered with a glass filter, the obtained solid was washed with water until the wash solution became neutral, then dispersed in 200 ml of chlorobenzen and stirred at room temperature for 1 hr in a state that water existed without being dried at 50° C. for 5 hrs. Subsequently, the solution was filtered with a glass filter, then the obtained solid was vacuum dried and 4.2 g of a non-substituted titanyl phthalocyanin crystal (blue powder) represented by the formula (3) was obtained.

Figure 13:
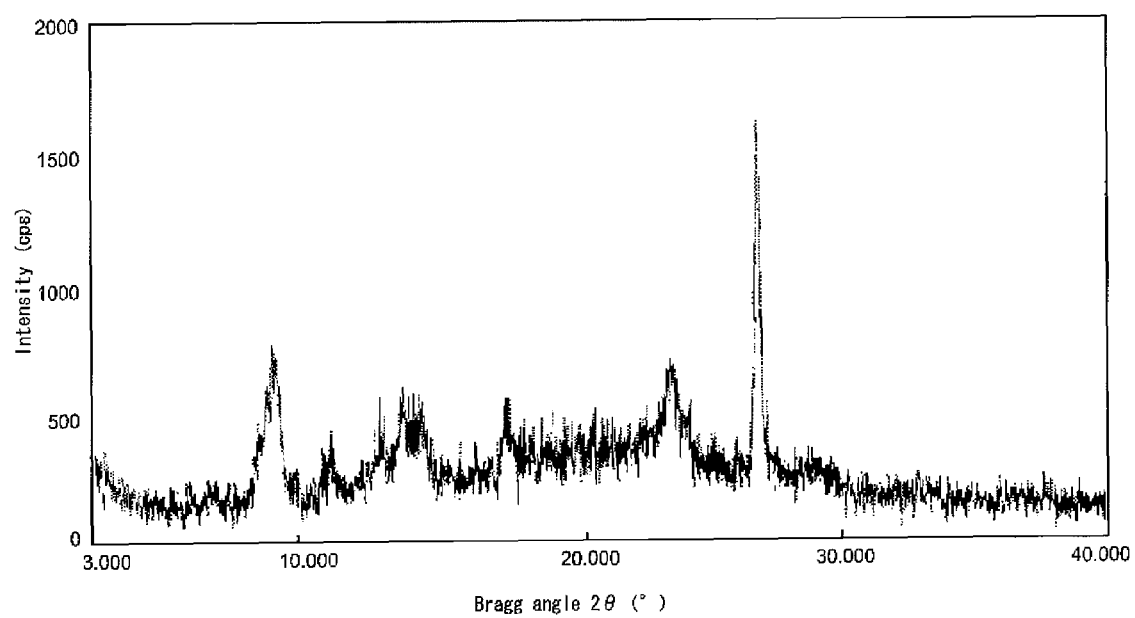
FIG. 13 is a spectrum for showing a CuKα characteristic X-ray diffraction of a titanyl phthalocyanin crystal (after stored for 7 days in tetrahydrofuran) used in Comparative Example 43 (Comparative Examples 44 to 63 and 120 to 126).
Figure 14:
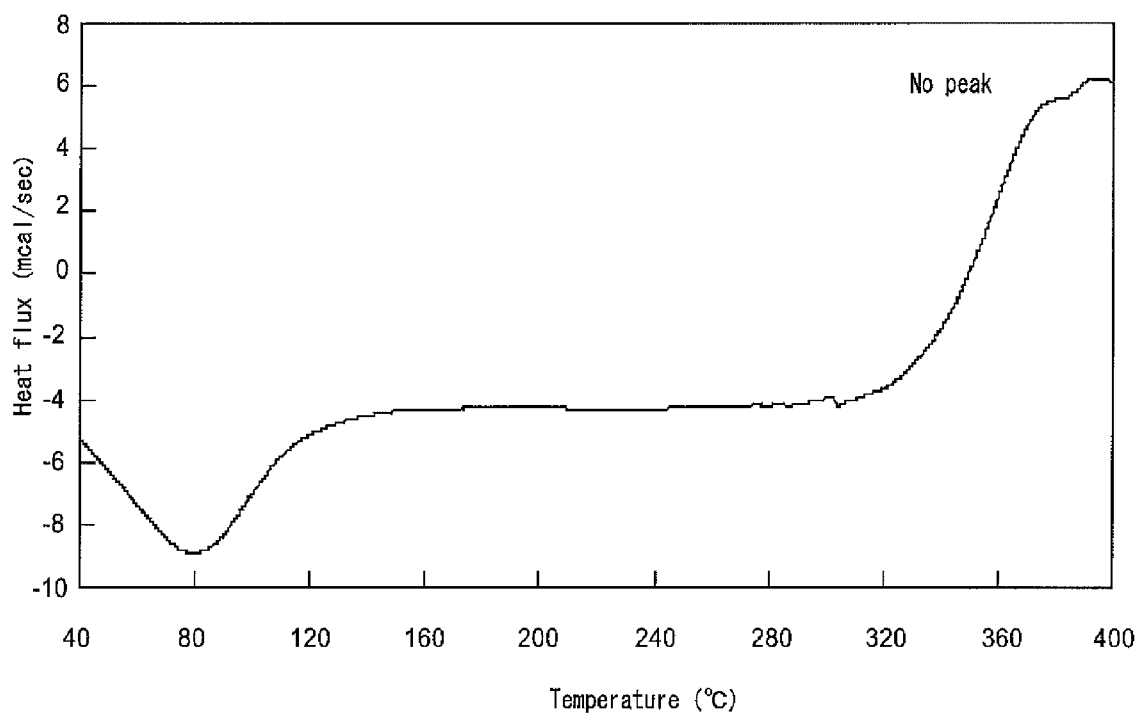
FIG. 14 is a chart for showing a differential scanning calorimetric analysis of a titanyl phthalocyanin crystal used in Comparative Example 43 (Comparative Examples 44 to 63 and 120 to 126).

Besides, the preparation of titanyl phthalocyanin crystal and the constitution of single layer photoconductor were performed and evaluated in the same manner as Comparative examples 1 to 21, respectively. The obtained results are shown in Table 2, FIG. 13 and FIG. 14.

Comparative Examples 64 to 84

Figure 15:
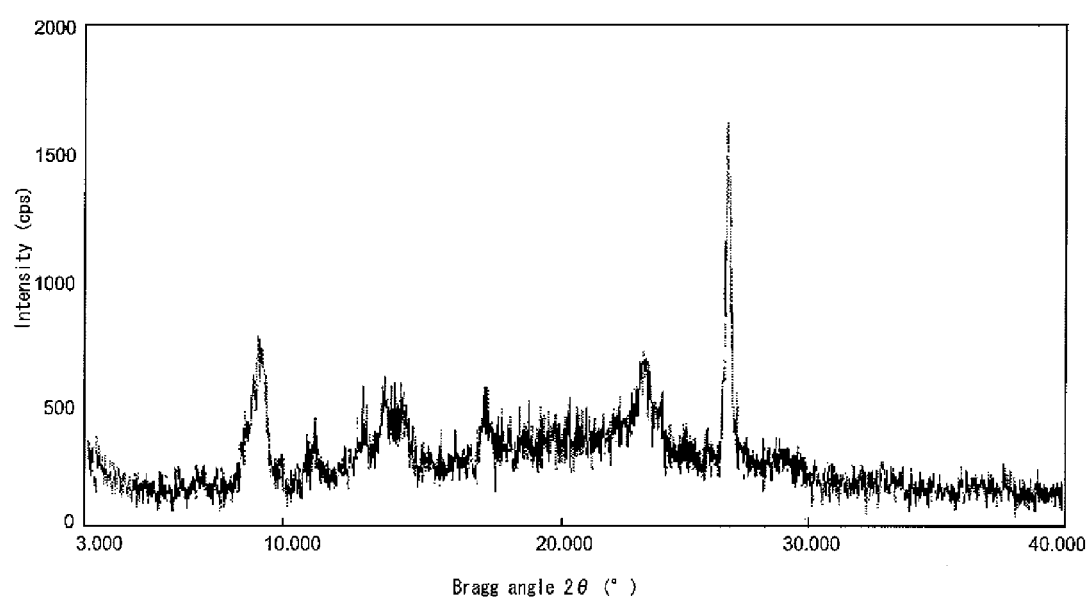
FIG. 15 is a spectrum for showing a CuKα characteristic X-ray diffraction of a titanyl phthalocyanin crystal (after stored for 7 days in tetrahydrofuran) used in Comparative Example 64 (Comparative Examples 65 to 84 and 127 to 133).
Figure 16:
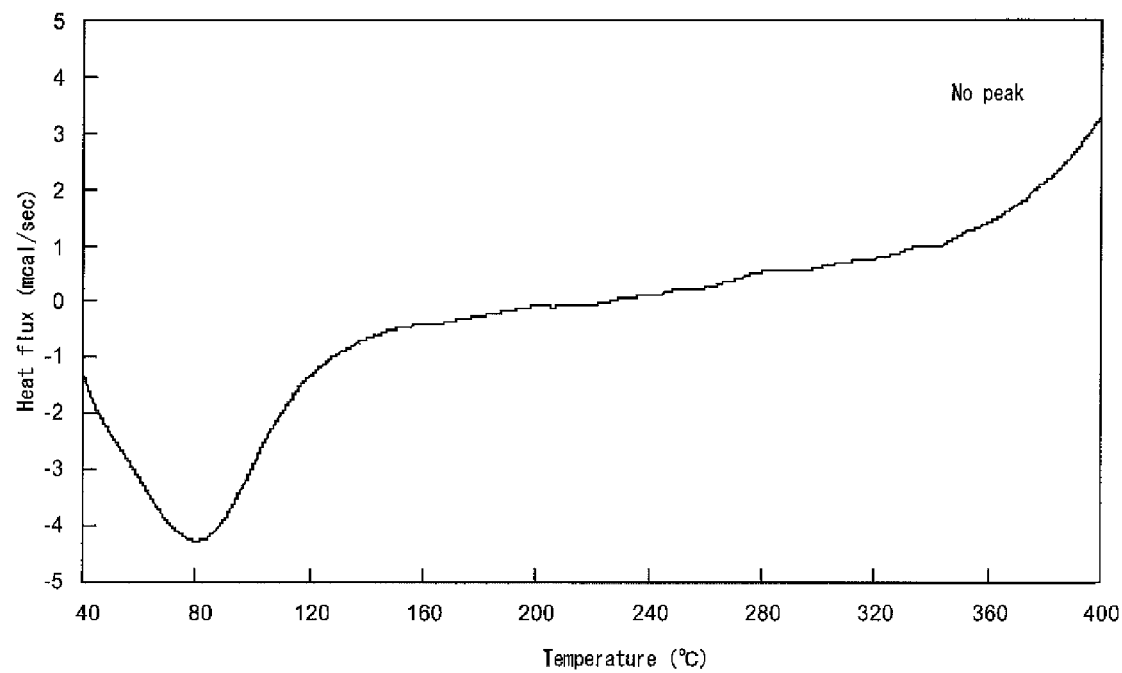
FIG. 16 is a chart for showing a differential scanning calorimetric analysis of a titanyl phthalocyanin crystal used in Comparative Example 64 (Comparative Examples 65 to 84 and 127 to 133).

The preparation of titanyl phthalocyanin crystal and the constitution of single layer photoconductor were performed and evaluated in the same manner as Examples 22 to 42, respectively except that the amount of titanium tetrabutoxide used in preparing a titanyl phthalocyanin crystal was 15.0 g (0.044 mole) in Comparative examples 64 to 84 in place of 25.0 g (0.073 mole) in Examples 22 to 42. The obtained results are shown in Table 3, FIG. 15 and FIG. 16.

Comparative Examples 85 to 105

Figure 17:
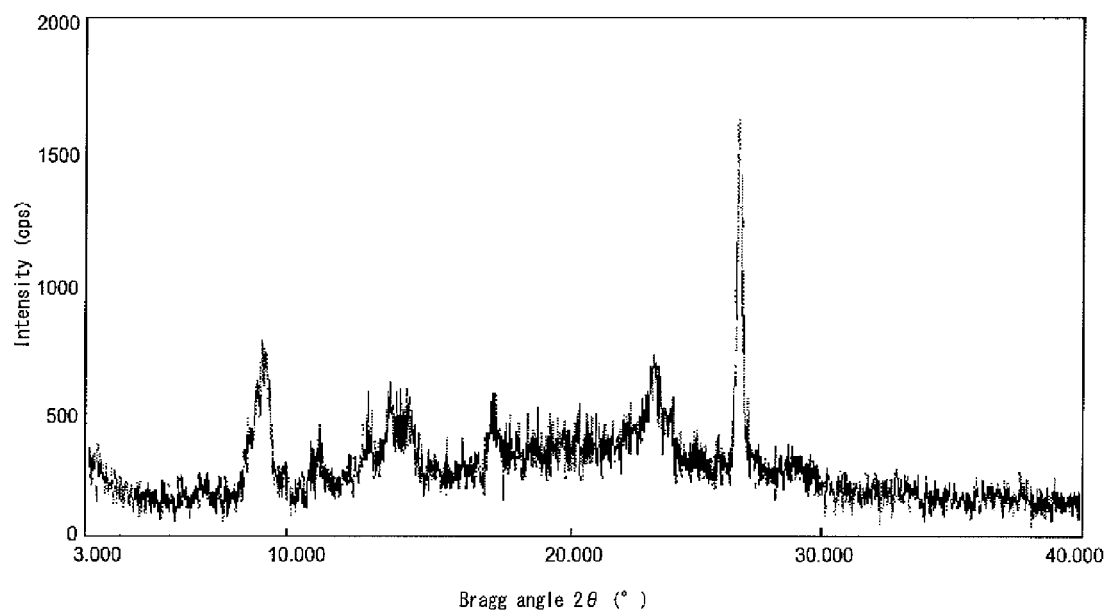
FIG. 17 is a spectrum for showing a CuKα characteristic X-ray diffraction of a titanyl phthalocyanin crystal (after stored for 7 days in tetrahydrofuran) used in Comparative Example 85 (Comparative Examples 86 to 105 and 134 to 140).
Figure 18:
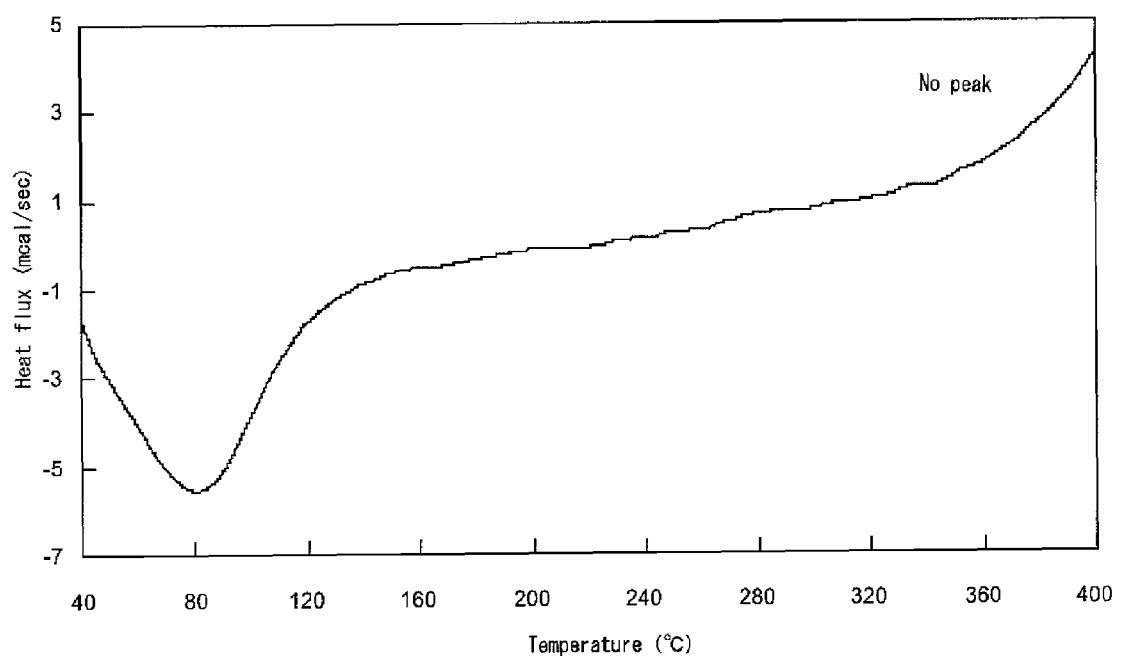
FIG. 18 is a chart for showing a differential scanning calorimetric analysis of a titanyl phthalocyanin crystal used in Comparative Example 85 (Comparative Examples 86 to 105 and 134 to 140).

The preparation of titanyl phthalocyanin crystal and the constitution of single layer photoconductor were performed and evaluated in the same manner as Examples 1 to 21, respectively except that the amount of urea used in preparing a titanyl phthalocyanin crystal was 20.25 g (0.342 mole) in Comparative examples 85 to 105 in place of 2.28 g (0.038 mole) in Examples 1 to 21. The obtained results are shown in Table 3, FIG. 17 and FIG. 18.

TABLE 1

| | Bragg Angle | DSC Peak | | | | Electric Characteristic | | |
|---|---|---|---|---|---|---|---|---|
| | 2 θ ± 0.2° Peak Evaluation | Temp. (° C.) | Number (peak) | HTM | ETM | Bright Potential Change (V) | Evaluation | Image Fog |
| Example 1 | ○ | 296 | 1 | HTM-1 | ETM-1 | 1 | ○ | ○ |
| Example 2 | | | | | ETM-2 | 0 | ○ | ○ |
| Example 3 | | | | | ETM-3 | −2 | ○ | ○ |
| Example 4 | | | | HTM-2 | ETM-1 | 1 | ○ | ○ |
| Example 5 | | | | | ETM-2 | 1 | ○ | ○ |
| Example 6 | | | | | ETM-3 | 1 | ○ | ○ |
| Example 7 | | | | HTM-3 | ETM-1 | 2 | ○ | ○ |

TABLE 1-continued

|  | Bragg Angle 2 θ ± 0.2° Peak Evaluation | DSC Peak Temp. (° C.) | DSC Peak Number (peak) | HTM | ETM | Bright Potential Change (V) | Evaluation | Image Fog |
|---|---|---|---|---|---|---|---|---|
| Example 8 |  |  |  |  | ETM-2 | −3 | ○ | ○ |
| Example 9 |  |  |  |  | ETM-3 | 2 | ○ | ○ |
| Example 10 |  |  |  | HTM-4 | ETM-1 | 2 | ○ | ○ |
| Example 11 |  |  |  |  | ETM-2 | −2 | ○ | ○ |
| Example 12 |  |  |  |  | ETM-3 | 2 | ○ | ○ |
| Example 13 |  |  |  | HTM-5 | ETM-1 | −1 | ○ | ○ |
| Example 14 |  |  |  |  | ETM-2 | −1 | ○ | ○ |
| Example 15 |  |  |  |  | ETM-3 | 0 | ○ | ○ |
| Example 16 |  |  |  | HTM-6 | ETM-1 | 7 | ○ | ○ |
| Example 17 |  |  |  |  | ETM-2 | 5 | ○ | ○ |
| Example 18 |  |  |  |  | ETM-3 | 3 | ○ | ○ |
| Example 19 |  |  |  | HTM-7 | ETM-1 | 2 | ○ | ○ |
| Example 20 |  |  |  |  | ETM-2 | −1 | ○ | ○ |
| Example 21 |  |  |  |  | ETM-3 | 3 | ○ | ○ |
| Example 22 | ○ | 327 | 1 | HTM-1 | ETM-1 | 1 | ○ | ○ |
| Example 23 |  |  |  |  | ETM-2 | 0 | ○ | ○ |
| Example 24 |  |  |  |  | ETM-3 | 6 | ○ | ○ |
| Example 25 |  |  |  | HTM-2 | ETM-1 | 5 | ○ | ○ |
| Example 26 |  |  |  |  | ETM-2 | 4 | ○ | ○ |
| Example 27 |  |  |  |  | ETM-3 | 6 | ○ | ○ |
| Example 28 |  |  |  | HTM-3 | ETM-1 | −1 | ○ | ○ |
| Example 29 |  |  |  |  | ETM-2 | −3 | ○ | ○ |
| Example 30 |  |  |  |  | ETM-3 | 2 | ○ | ○ |
| Example 31 |  |  |  | HTM-4 | ETM-1 | 3 | ○ | ○ |
| Example 32 |  |  |  |  | ETM-2 | 3 | ○ | ○ |
| Example 33 |  |  |  |  | ETM-3 | −1 | ○ | ○ |
| Example 34 |  |  |  | HTM-5 | ETM-1 | 2 | ○ | ○ |
| Example 35 |  |  |  |  | ETM-2 | −3 | ○ | ○ |
| Example 36 |  |  |  |  | ETM-3 | 4 | ○ | ○ |
| Example 37 |  |  |  | HTM-6 | ETM-1 | 2 | ○ | ○ |
| Example 38 |  |  |  |  | ETM-2 | 4 | ○ | ○ |
| Example 39 |  |  |  |  | ETM-3 | −2 | ○ | ○ |
| Example 40 |  |  |  | HTM-7 | ETM-1 | 2 | ○ | ○ |
| Example 41 |  |  |  |  | ETM-2 | 0 | ○ | ○ |
| Example 42 |  |  |  |  | ETM-3 | 4 | ○ | ○ |
| Example 43 | ○ | 372 | 1 | HTM-1 | ETM-1 | 1 | ○ | ○ |
| Example 44 |  |  |  |  | ETM-2 | 3 | ○ | ○ |
| Example 45 |  |  |  |  | ETM-3 | 2 | ○ | ○ |
| Example 46 |  |  |  | HTM-2 | ETM-1 | 1 | ○ | ○ |
| Example 47 |  |  |  |  | ETM-2 | 1 | ○ | ○ |
| Example 48 |  |  |  |  | ETM-3 | 2 | ○ | ○ |
| Example 49 |  |  |  | HTM-3 | ETM-1 | −1 | ○ | ○ |
| Example 50 |  |  |  |  | ETM-2 | −3 | ○ | ○ |
| Example 51 |  |  |  |  | ETM-3 | 2 | ○ | ○ |
| Example 52 |  |  |  | HTM-4 | ETM-1 | 1 | ○ | ○ |
| Example 53 |  |  |  |  | ETM-2 | −1 | ○ | ○ |
| Example 54 |  |  |  |  | ETM-3 | 3 | ○ | ○ |
| Example 55 |  |  |  | HTM-5 | ETM-1 | 3 | ○ | ○ |
| Example 56 |  |  |  |  | ETM-2 | 3 | ○ | ○ |
| Example 57 |  |  |  |  | ETM-3 | 2 | ○ | ○ |
| Example 58 |  |  |  | HTM-6 | ETM-1 | 2 | ○ | ○ |
| Example 59 |  |  |  |  | ETM-2 | 0 | ○ | ○ |
| Example 60 |  |  |  |  | ETM-3 | −3 | ○ | ○ |
| Example 61 |  |  |  | HTM-7 | ETM-1 | 2 | ○ | ○ |
| Example 62 |  |  |  |  | ETM-2 | 1 | ○ | ○ |
| Example 63 |  |  |  |  | ETM-3 | 1 | ○ | ○ |

TABLE 2

|  | Bragg Angle 2 θ ± 0.2° Peak Evaluation | DSC Peak Temp. (° C.) | DSC Peak Number (peak) | HTM | ETM | Bright Potential Change (V) | Evaluation | Image Fog |
|---|---|---|---|---|---|---|---|---|
| Comparative example 1 | ○ | none | 0 | HTM-1 | ETM-1 | 1 | ○ | Δ |
| Comparative example 2 |  |  |  |  | ETM-2 | 3 | ○ | Δ |
| Comparative example 3 |  |  |  |  | ETM-3 | 2 | ○ | Δ |
| Comparative example 4 |  |  |  | HTM-2 | ETM-1 | 1 | ○ | Δ |
| Comparative example 5 |  |  |  |  | ETM-2 | 1 | ○ | Δ |
| Comparative example 6 |  |  |  |  | ETM-3 | 2 | ○ | Δ |
| Comparative example 7 |  |  |  | HTM-3 | ETM-1 | −1 | ○ | Δ |

TABLE 2-continued

|  | Bragg Angle 2θ ± 0.2° Peak Evaluation | DSC Peak Temp. (°C.) | DSC Peak Number (peak) | HTM | ETM | Bright Potential Change (V) | Evaluation | Image Fog |
|---|---|---|---|---|---|---|---|---|
| Comparative example 8 |  |  |  |  | ETM-2 | −3 | ○ | Δ |
| Comparative example 9 |  |  |  |  | ETM-3 | 2 | ○ | Δ |
| Comparative example 10 |  |  |  | HTM-4 | ETM-1 | 1 | ○ | Δ |
| Comparative example 11 |  |  |  |  | ETM-2 | −1 | ○ | Δ |
| Comparative example 12 |  |  |  |  | ETM-3 | 3 | ○ | Δ |
| Comparative example 13 |  |  |  | HTM-5 | ETM-1 | 3 | ○ | Δ |
| Comparative example 14 |  |  |  |  | ETM-2 | 3 | ○ | Δ |
| Comparative example 15 |  |  |  |  | ETM-3 | 2 | ○ | Δ |
| Comparative example 16 |  |  |  | HTM-6 | ETM-1 | 2 | ○ | Δ |
| Comparative example 17 |  |  |  |  | ETM-2 | 0 | ○ | Δ |
| Comparative example 18 |  |  |  |  | ETM-3 | −3 | ○ | Δ |
| Comparative example 19 |  |  |  | HTM-7 | ETM-1 | 2 | ○ | Δ |
| Comparative example 20 |  |  |  |  | ETM-2 | 1 | ○ | Δ |
| Comparative example 21 |  |  |  |  | ETM-3 | 1 | ○ | Δ |
| Comparative example 22 | x | 232 | 1 | HTM-1 | ETM-1 | 425 | x | x |
| Comparative example 23 |  |  |  |  | ETM-2 | 426 | x | x |
| Comparative example 24 |  |  |  |  | ETM-3 | 433 | x | x |
| Comparative example 25 |  |  |  | HTM-2 | ETM-1 | 424 | x | x |
| Comparative example 26 |  |  |  |  | ETM-2 | 427 | x | x |
| Comparative example 27 |  |  |  |  | ETM-3 | 431 | x | x |
| Comparative example 28 |  |  |  | HTM-3 | ETM-1 | 419 | x | x |
| Comparative example 29 |  |  |  |  | ETM-2 | 431 | x | x |
| Comparative example 30 |  |  |  |  | ETM-3 | 421 | x | x |
| Comparative example 31 |  |  |  | HTM-4 | ETM-1 | 441 | x | x |
| Comparative example 32 |  |  |  |  | ETM-2 | 422 | x | x |
| Comparative example 33 |  |  |  |  | ETM-3 | 433 | x | x |
| Comparative example 34 |  |  |  | HTM-5 | ETM-1 | 424 | x | x |
| Comparative example 35 |  |  |  |  | ETM-2 | 422 | x | x |
| Comparative example 36 |  |  |  |  | ETM-3 | 434 | x | x |
| Comparative example 37 |  |  |  | HTM-6 | ETM-1 | 412 | x | x |
| Comparative example 38 |  |  |  |  | ETM-2 | 434 | x | x |
| Comparative example 39 |  |  |  |  | ETM-3 | 422 | x | x |
| Comparative example 40 |  |  |  | HTM-7 | ETM-1 | 427 | x | x |
| Comparative example 41 |  |  |  |  | ETM-2 | 424 | x | x |
| Comparative example 42 |  |  |  |  | ETM-3 | 427 | x | x |
| Comparative example 43 | ○ | none | 0 | HTM-1 | ETM-1 | 16 | x | x |
| Comparative example 44 |  |  |  |  | ETM-2 | 11 | x | x |
| Comparative example 45 |  |  |  |  | ETM-3 | 18 | x | x |
| Comparative example 46 |  |  |  | HTM-2 | ETM-1 | 21 | x | x |
| Comparative example 47 |  |  |  |  | ETM-2 | 19 | x | x |
| Comparative example 48 |  |  |  |  | ETM-3 | 16 | x | x |
| Comparative example 49 |  |  |  | HTM-3 | ETM-1 | 15 | x | x |
| Comparative example 50 |  |  |  |  | ETM-2 | 15 | x | x |
| Comparative example 51 |  |  |  |  | ETM-3 | 13 | x | x |
| Comparative example 52 |  |  |  | HTM-4 | ETM-1 | 17 | x | x |
| Comparative example 53 |  |  |  |  | ETM-2 | 17 | x | x |
| Comparative example 54 |  |  |  |  | ETM-3 | 16 | x | x |
| Comparative example 55 |  |  |  | HTM-5 | ETM-1 | 11 | x | x |
| Comparative example 56 |  |  |  |  | ETM-2 | 16 | x | x |
| Comparative example 57 |  |  |  |  | ETM-3 | 19 | x | x |
| Comparative example 58 |  |  |  | HTM-6 | ETM-1 | 20 | x | x |
| Comparative example 59 |  |  |  |  | ETM-2 | 28 | x | x |
| Comparative example 60 |  |  |  |  | ETM-3 | 22 | x | x |
| Comparative example 61 |  |  |  |  | ETM-1 | 16 | x | x |
| Comparative example 62 |  |  |  | HTM-7 | ETM-2 | 18 | x | x |
| Comparative example 63 |  |  |  |  | ETM-3 | 14 | x | x |

TABLE 3

|  | Bragg Angle 2θ ± 0.2° Peak Evaluation | DSC Peak Temp. (°C.) | DSC Peak Number (peak) | HTM | ETM | Bright Potential Change (V) | Evaluation | Image Fog |
|---|---|---|---|---|---|---|---|---|
| Comparative example 64 | ○ | none | 0 | HTM-1 | ETM-1 | 18 | x | x |
| Comparative example 65 |  |  |  |  | ETM-2 | 16 | x | x |
| Comparative example 66 |  |  |  |  | ETM-3 | 14 | x | x |
| Comparative example 67 |  |  |  | HTM-2 | ETM-1 | 12 | x | x |
| Comparative example 68 |  |  |  |  | ETM-2 | 12 | x | x |
| Comparative example 69 |  |  |  |  | ETM-3 | 13 | x | x |
| Comparative example 70 |  |  |  | HTM-3 | ETM-1 | 16 | x | x |

TABLE 3-continued

| | Bragg Angle 2θ ± 0.2° Peak Evaluation | DSC Peak Temp. (°C.) | DSC Peak Number (peak) | HTM | ETM | Bright Potential Change (V) | Evaluation | Image Fog |
|---|---|---|---|---|---|---|---|---|
| Comparative example 71 | | | | | ETM-2 | 15 | x | x |
| Comparative example 72 | | | | | ETM-3 | 17 | x | x |
| Comparative example 73 | | | | HTM-4 | ETM-1 | 24 | x | x |
| Comparative example 74 | | | | | ETM-2 | 26 | x | x |
| Comparative example 75 | | | | | ETM-3 | 25 | x | x |
| Comparative example 76 | | | | HTM-5 | ETM-1 | 24 | x | x |
| Comparative example 77 | | | | | ETM-2 | 26 | x | x |
| Comparative example 78 | | | | | ETM-3 | 28 | x | x |
| Comparative example 79 | | | | HTM-6 | ETM-1 | 21 | x | x |
| Comparative example 80 | | | | | ETM-2 | 24 | x | x |
| Comparative example 81 | | | | | ETM-3 | 22 | x | x |
| Comparative example 82 | | | | HTM-7 | ETM-1 | 16 | x | x |
| Comparative example 83 | | | | | ETM-2 | 16 | x | x |
| Comparative example 84 | | | | | ETM-3 | 14 | x | x |
| Comparative example 85 | ○ | none | 0 | HTM-1 | ETM-1 | 2 | ○ | x |
| Comparative example 86 | | | | | ETM-2 | 3 | ○ | x |
| Comparative example 87 | | | | | ETM-3 | 1 | ○ | x |
| Comparative example 88 | | | | HTM-2 | ETM-1 | −2 | ○ | x |
| Comparative example 89 | | | | | ETM-2 | −2 | ○ | x |
| Comparative example 90 | | | | | ETM-3 | 2 | ○ | x |
| Comparative example 91 | | | | HTM-3 | ETM-1 | −1 | ○ | x |
| Comparative example 92 | | | | | ETM-2 | 3 | ○ | x |
| Comparative example 93 | | | | | ETM-3 | 4 | ○ | x |
| Comparative example 94 | | | | HTM-4 | ETM-1 | 4 | ○ | x |
| Comparative example 95 | | | | | ETM-2 | 2 | ○ | x |
| Comparative example 96 | | | | | ETM-3 | 2 | ○ | x |
| Comparative example 97 | | | | HTM-5 | ETM-1 | 6 | ○ | x |
| Comparative example 98 | | | | | ETM-2 | 3 | ○ | x |
| Comparative example 99 | | | | | ETM-3 | 3 | ○ | x |
| Comparative example 100 | | | | HTM-6 | ETM-1 | 5 | ○ | x |
| Comparative example 101 | | | | | ETM-2 | −2 | ○ | x |
| Comparative example 102 | | | | | ETM-3 | 2 | ○ | x |
| Comparative example 103 | | | | HTM-7 | ETM-1 | −2 | ○ | x |
| Comparative example 104 | | | | | ETM-2 | 3 | ○ | x |
| Comparative example 105 | | | | | ETM-3 | 3 | ○ | x |

Example 64

A laminated layer photoconductor was constituted as shown below by preparing a titanyl phthalocyanin crystal in the same manner as Examples 1 to 21 and using it as a charge generating agent and using the hole transfer agent (HTM-1) represented by the formula (22) as a hole transfer agent in Example 64. It was evaluated in the same manner as Examples 1 to 21 except that Microline 22N manufactured by Oki Electric, Ltd. as an evaluating machine in the evaluation of image fogging. The result is shown in Table 4.

In addition, the titanyl phthalocyanin crystal used is same as in Examples 1 to 21, therefore the presentation of the CuKα characteristic X-ray diffraction spectrum and the differential scanning calorimetric analysis chart is omitted. The manufacturing method of the laminated layer photoconductor of Example 64 is shown hereinafter.

1. Constitution of Laminated Layer Photoconductor (1) Intermediate Layer 2.5 part by weight of titanium oxide (MT-02 (number-average primary particle diameter 10 nm) manufactured by Teika, Ltd.) that was surface-treated with alumina and silica and then with methyl-hydrogen polysiloxane, 1 part by weight of Amilan CM8000 (made by Toray Inc.) that was a 6, 12, 66, 610 four-dimensional polymerized polyamide resin, 10 part by weight of methanol and 2.5 part by weight of butanol were received in a paint shaker and then dispersed for 10 hrs to prepare a coating solution for a photosensitive layer for intermediate layer.

The obtained coating solution for the photosensitive layer was filtered with a 5 μm filter and then applied to an aluminum drum-type support substrate of 30 mm in diameter and 238.5 mm in total length as a conductive substrate. Subsequently, it was heat-treated at 130° C. for 30 min to form an intermediate layer of 2 μm in film thickness.

(2) Charge Generating Layer

Next, 1 part by weight of the titanyl phthalocyanin crystal prepared as a charge generating agent by Example 1, 1 part by weight of a polyvinyl acetal resin (Eslek KS-5 made by Sekisui Chemical, Ltd.) being a binder resin, 60 part by weight of propylene glycol monomethyl ether being a dispersion medium and 20 part by weight of tetrahydrofuran were mixed for 48 hrs and then dispersed by a ball mill to form a coating solution for a photosensitive layer for charge generating layer.

The obtained coating solution for the photosensitive layer was filtered with a 3 μm filter, then applied onto the above-mentioned intermediate layer and dried at 80° C. for 5 min to form a charge generating layer of 0.3 μm in film thickness.

(3) Charge Transfer Layer

Next, 70 part by weight of the hole transfer agent (HTM-1) represented by the formula (22), 100 part by weight of a polycarbonate being a binder resin were mixed and dissolved with 460 part by weight of tetrahydrofuran to prepare a coating solution for a photosensitive layer for charge transfer layer.

Next, this coating solution for the photosensitive layer was applied onto the charge generating layer as the coating solution for the photosensitive layer for charge generating layer within 60 min after it was prepared, in the same manner. Subsequently, it was dried at 130° C. for 30 min to form a charge transfer layer of 20 μm in film thickness. These layers were make into an electrophotographic photoconductor having a laminated photosensitive layer as a whole.

The above-mentioned coating solutions for the photosensitive layer were stored for 7 days in a closed system of temperature 23±1° C. and relative humidity 50 to 60% RH, next dispersed again by using a supersonic disperser and then applied, in the same manner, by the above-mentioned method for constituting an electrophotographic photoconductor having a laminated photosensitive layer.

Examples 65 to 70

Laminated layer photoconductors were constituted and evaluated in the same manner as Example 64, respectively except that the hole transfer agents (HTM-2 to 7) shown in Table 2 were used in Examples 65 to 70 in place of the hole transfer agent (HTM-1) used in Example 64 in constituting the photoconductors, respectively. The results are shown in Table 4.

A titanyl phthalocyanin crystal used is same as in Examples 1 to 21, therefore the description of the CuKα characteristic X-ray diffraction spectrum and the differential scanning calorimetric analysis chart is omitted Examples 71 to 77

Laminated layer photoconductors were constituted and evaluated in the same manner as Examples 64 to 70, respectively in Examples 71 to 77 except that the titanyl phthalocyanin crystal was prepared in the same manner as Examples 22 to 42. The results are shown in Table 4.

The titanyl phthalocyanin crystal used is same as in Examples 22 to 42, therefore the presentation of the CuKα characteristic X-ray diffraction spectrum and the differential scanning calorimetric analysis chart is omitted.

Examples 78 to 84

Laminated layer photoconductors were constituted and evaluated in the same manner as Examples 64 to 70, respectively in Examples 78 to 84 except that the titaryl phthalocyanin crystal was prepared in the same manner as Examples 43 to 63. The results are shown in Table 4.

The titanyl phthalocyanin crystal used is same as in Examples 43 to 63, therefore the presentation of the CuKα characteristic X-ray diffraction spectrum and the differential scanning calorimetric analysis chart is omitted.

Comparative Examples 106 to 112

Laminated layer photoconductors were constituted and evaluated in the same manner as Examples 64 to 70, respectively in Comparative examples 106 to 112 except that the titanyl phthalocyanin crystal was prepared in the same manner as Comparative examples 1 to 21. The results are shown in Table 4.

The titanyl phthalocyanin crystal used is same as in Comparative examples 1 to 21, therefore the description of the CuKα characteristic X-ray diffraction spectrum and the differential scanning calorimetric analysis chart is omitted.

Comparative Examples 113 to 119

Laminated layer photoconductors were constituted and evaluated in the same manner as Examples 64 to 70, respectively in Comparative examples 113 to 119 except that the titanyl phthalocyanin crystal was prepared in the same manner as Comparative examples 22 to 42. The results are shown in Table 4.

The titanyl phthalocyanin crystal used is same as in Comparative examples 22 to 42, therefore the description of the CuKα characteristic X-ray diffraction spectrum and the differential scanning calorimetric analysis chart is omitted.

Comparative Examples 120 to 126

Laminated layer photoconductors were constituted and evaluated in the same manner as Examples 64 to 70, respectively in Comparative examples 170 to 126 except that the titanyl phthalocyanin crystal was prepared in the same manner as Comparative examples 43 to 63. The results are shown in Table 4.

The titanyl phthalocyanin crystal used is same as in Comparative examples 43 to 63, therefore the description of the CuKα characteristic X-ray diffraction spectrum and the differential scanning calorimetric analysis chart is omitted.

Comparative examples 127 to 133

Laminated layer photoconductors were constituted and evaluated in the same manner as Examples 64 to 70, respectively in Comparative examples 127 to 133 except that the titanyl phthalocyanin crystal was prepared in the same manner as Comparative examples 64 to 84. The results are shown in Table 4.

The tithanylphthalocyanine crystal used is same as in Comparative examples 64 to 84, therefore the description of the CuKα characteristic X-ray diffraction spectrum and the differential scanning calorimetric analysis chart is omitted.

Comparative Examples 134 to 140

Laminated layer photoconductors were constituted and evaluated in the same manner as Examples 64 to 70, respectively in Comparative examples 134 to 140 except that the titanyl phthalocyanin crystal was prepared in the same manner as Comparative examples 85 to 105. The results are shown in Table 4. The titanyl phthalocyanin crystal used is same as in Comparative examples 85 to 105, therefore the description of the CuKα characteristic X-ray diffraction spectrum and the differential scanning calorimetric analysis chart is omitted.

TABLE 4

| | Bragg Angle | DSC Peak | | | Electric Characteristic | | |
| --- | --- | --- | --- | --- | --- | --- | --- |
| | $2\theta \pm 0.2°$ Peak Evaluation | Temp. (°C.) | Number (peak) | HTM | Bright Potential Change (V) | Evaluation | Image Fog |
| Example 64 | | 296 | 1 | HTM-1 | 2 | ○ | ○ |
| Example 65 | ○ | | | HTM-2 | 1 | ○ | ○ |

TABLE 4-continued

|  | Bragg Angle 2θ ± 0.2° Peak Evaluation | DSC Peak Temp. (°C.) | DSC Peak Number (peak) | HTM | Electric Characteristic Bright Potential Change (V) | Electric Characteristic Evaluation | Image Fog |
|---|---|---|---|---|---|---|---|
| Example 66 |  |  |  | HTM-3 | 0 | ○ | ○ |
| Example 67 |  |  |  | HTM-4 | 3 | ○ | ○ |
| Example 68 |  |  |  | HTM-5 | 4 | ○ | ○ |
| Example 69 |  |  |  | HTM-6 | 5 | ○ | ○ |
| Example 70 |  |  |  | HTM-7 | 2 | ○ | ○ |
| Example 71 | ○ | 327 | 1 | HTM-1 | 2 | ○ | ○ |
| Example 72 |  |  |  | HTM-2 | 4 | ○ | ○ |
| Example 73 |  |  |  | HTM-3 | 3 | ○ | ○ |
| Example 74 |  |  |  | HTM-4 | 1 | ○ | ○ |
| Example 75 |  |  |  | HTM-5 | 0 | ○ | ○ |
| Example 76 |  |  |  | HTM-6 | 2 | ○ | ○ |
| Example 77 |  |  |  | HTM-7 | −2 | ○ | ○ |
| Example 78 | ○ | 372 | 1 | HTM-1 | 2 | ○ | ○ |
| Example 79 |  |  |  | HTM-2 | 4 | ○ | ○ |
| Example 80 |  |  |  | HTM-3 | 3 | ○ | ○ |
| Example 81 |  |  |  | HTM-4 | 1 | ○ | ○ |
| Example 82 |  |  |  | HTM-5 | 0 | ○ | ○ |
| Example 83 |  |  |  | HTM-6 | 2 | ○ | ○ |
| Example 84 |  |  |  | HTM-7 | −2 | ○ | ○ |
| Comparative example 106 | ○ | none | 0 | HTM-1 | 1 | ○ | Δ |
| Comparative example 107 |  |  |  | HTM-2 | −3 | ○ | Δ |
| Comparative example 108 |  |  |  | HTM-3 | 2 | ○ | Δ |
| Comparative example 109 |  |  |  | HTM-4 | 2 | ○ | Δ |
| Comparative example 110 |  |  |  | HTM-5 | 0 | ○ | Δ |
| Comparative example 111 |  |  |  | HTM-6 | 3 | ○ | Δ |
| Comparative example 112 |  |  |  | HTM-7 | −2 | ○ | Δ |
| Comparative example 113 | x | 232 | 1 | HTM-1 | 62 | x | x |
| Comparative example 114 |  |  |  | HTM-2 | 61 | x | x |
| Comparative example 115 |  |  |  | HTM-3 | 62 | x | x |
| Comparative example 116 |  |  |  | HTM-4 | 61 | x | x |
| Comparative example 117 |  |  |  | HTM-5 | 71 | x | x |
| Comparative example 118 |  |  |  | HTM-6 | 64 | x | x |
| Comparative example 119 |  |  |  | HTM-7 | 76 | x | x |
| Comparative example 120 | ○ | none | 0 | HTM-1 | 16 | x | x |
| Comparative example 121 |  |  |  | HTM-2 | 19 | x | x |
| Comparative example 122 |  |  |  | HTM-3 | 11 | x | x |
| Comparative example 123 |  |  |  | HTM-4 | 15 | x | x |
| Comparative example 124 |  |  |  | HTM-5 | 18 | x | x |
| Comparative example 125 |  |  |  | HTM-6 | 15 | x | x |
| Comparative example 126 |  |  |  | HTM-7 | 31 | x | x |
| Comparative example 127 | ○ | none | 0 | HTM-1 | 12 | x | x |
| Comparative example 128 |  |  |  | HTM-2 | 16 | x | x |
| Comparative example 129 |  |  |  | HTM-3 | 17 | x | x |
| Comparative example 130 |  |  |  | HTM-4 | 11 | x | x |
| Comparative example 131 |  |  |  | HTM-5 | 12 | x | x |
| Comparative example 132 |  |  |  | HTM-6 | 12 | x | x |
| Comparative example 133 |  |  |  | HTM-7 | 16 | x | x |
| Comparative example 134 | ○ | none | 0 | HTM-1 | 2 | ○ | x |
| Comparative example 135 |  |  |  | HTM-2 | 4 | ○ | x |
| Comparative example 136 |  |  |  | HTM-3 | −2 | ○ | x |
| Comparative example 137 |  |  |  | HTM-4 | 3 | ○ | x |
| Comparative example 138 |  |  |  | HTM-5 | 5 | ○ | x |
| Comparative example 139 |  |  |  | HTM-6 | −1 | ○ | x |
| Comparative example 140 |  |  |  | HTM-7 | 0 | ○ | x |

Here, the mole number of titanium tetrabutoxide and urea added with respect to 1 mole of o-phthalonitrile and the mole number of urea in all the examples and comparative examples are shown in Table 5.

TABLE 5

|  | Titanium Tetrabutoxide (mole)/ o-Phthalonitrile (mole) | Urea (mole)/ o-Phthalonitrile (mole) |
|---|---|---|
| Examples 1 to 21 and Examples 64 to 70 | 0.43 | 0.22 |
| Examples 22 to 42 and Examples 71 to 77 | 0.43 | 0.56 |
| Examples 43 to 63 and Examples 78 to 84 | 0.43 | 0.82 |
| Comparative Examples 1 to 21 and Comparative Examples 106 to 112 | 0.43 | 0 |
| Comparative Examples 22 to 42 and | 0.43 | 0 |

TABLE 5-continued

| | Titanium Tetrabutoxide (mole)/ o-Phthalonitrile (mole) | Urea (mole)/ o-Phthalonitrile (mole) |
|---|---|---|
| Comparative Examples 113 to 119 | | |
| Comparative Examples 43 to 63 and Comparative Examples 120 to 126 | 0.43 | 0 |
| Comparative Examples 64 to 84 and Comparative Examples 127 to 133 | 0.26 | 0.56 |
| Comparative Examples 85 to 105 and Comparative Examples 134 to 140 | 0.43 | 2.0 |

INDUSTRIAL APPLICABILITY

According to the titanyl phthalocyanin crystal in the present invention, the storage stability in organic solvents could be sufficiently improved as compared with the conventional titanyl phthalocyanin crystal by having a peak at a predetermined Bragg angle in the CuKα characteristic X-ray diffraction spectrum and one peak within a predetermined temperature range in the differential scanning calorimetric analysis.

According to the method for preparing the titanyl phthalocyanin crystal in the present invention, the titanyl phthalocyanin crystal which is hard to transit the crystal to not only α-type but also β-type even in organic solvents was obtained with significant efficiency and at a low cost by reacting o-phthalonitrile or its derivative, 1,3-diiminoisoindoline or its derivative and titanium tetra-butoxide or titanium tetrachloride above a predetermined temperature in the presence of urea to prepare the titanyl phthalocyanin crystal.

Accordingly, it is expected that the electrophotographic photoconductor using the titanyl phthalocyanin crystal thus prepared not only improves electric characteristics and image characteristics in various image forming devices such as copy machine and printer, etc., but also further makes a considerable contribution to economical effects.

What is claimed is:

1. A method for preparing a titanyl phthalocyanine crystal having the main peak at a Bragg angle 2θ±0.2°=27.2° in CuKα characteristic X-ray diffraction spectrum and one peak within the range of 270 to 400° C. other than a peak accompanied by the vaporization of adsorbed water in a differential scanning calorimetric analysis and comprising the following processes from (a) to (c);
    (a) a process for preparing a titanyl phthalocyanine compound by adding a titanium alkoxide or titanium tetrachloride at a value within the range of 0.40 to 0.53 mole with respect to 1 mole of o-phthalonitrile or its derivative or 1,3-diiminoisoindoline or its derivative and adding a urea compound at a value within the range of 0.1 to 0.95 mole with respect to 1 mole of o-phthalonitrile or its derivative or 1,3-diiminoisoindoline or its derivative to react the compounds,
    (b) a preliminary process for performing an acid treatment by stirring and stabilizing in a water-soluble organic solvent on the titanyl phthalocyanine compound prepared in the process (a),
    (c) a process for preparing a titanyl phthalocyanine crystal by performing an acid treatment on the titanyl phthalocyanine compound prepared in the process (b).

2. The method for preparing a titanyl phthalocyanine crystal according to claim 1, wherein the titanyl phthalocyanine crystal has no peak at a Bragg angle 2θ±0.2°=26.2° in the CuKα characteristic X-ray diffraction spectrum.

3. The method for preparing a titanyl phthalocyanine crystal according to claim 1, wherein the titanyl phthalocyanine crystal recovered after being immersing for 7 days in an organic solvent has at least the main peak at a Bragg angle 2θ±0.2°=27.2° and no peak at 26.2° in the CuKα characteristic X-ray diffraction spectrum.

4. The method for preparing a titanyl phthalocyanine crystal according to claim 3, wherein an organic solvent is at least one selected from the group consisting of tetrahydrofuran, dichloromethane, toluene, 1,4-dioxane and 1-methoxy-2-propanol.

5. The method for preparing a titanyl phthalocyanine crystal according to claim 1, wherein the structure of the phthalocyanine compound is represented by the following general formula (1):

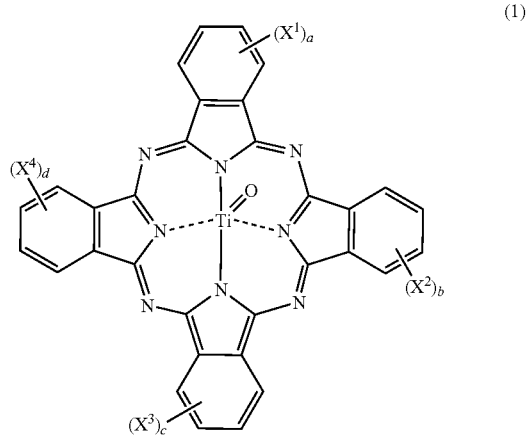

(In the general formula (1), $X^1$ to $X^4$ are the same or different substituents, each independently represents a hydrogen atom, a halogen atom, a substituted or an unsubstituted alkyl group, a substituted or an unsubstituted nitro group, respectively, the repeat number "a", "b", "c" and "d" represent an integer of 1 to 4, respectively and may be same or different, respectively).

6. The method for preparing the titanyl phthalocyanine crystal according to claim 1, wherein the urea compound is at least one compound selected from the group consisting of urea, thiourea, o-methylisourea sulfate, o-methylisourea carbonate and o-methylisourea hydrochloride.

7. The method for preparing the titanyl phthalocyanine crystal according to claim 1, wherein the reaction temperature in the process (a) is set to a value of 150° C. or above.

8. The method for preparing the titanyl phthalocyanine crystal according to claim 1, wherein the process (a) is performed in a nitrogen-containing compound as a solvent with a boiling point of 180° C. or above.

* * * * *